United States Patent [19]

Leslie et al.

[11] Patent Number: 4,686,540
[45] Date of Patent: Aug. 11, 1987

[54] COMPACT PLOTTER FOR GENERATION OF ACCURATE PLOTTED IMAGES OF LONG LENGTH

[75] Inventors: Elmer N. Leslie; Stephen S. Treadwell, III, both of Dallas; Thomas J. DiFloria, Allen; Larry D. Propst, Rowlett; Richard T. Kushmaul; Paul A. Abney, both of Dallas; Kenneth Stevenson, Plano; C. Kenneth Thomaston, Dallas, all of Tex.

[73] Assignee: Microdynamics, Inc., Dallas, Tex.

[21] Appl. No.: 852,987

[22] Filed: Apr. 15, 1986

[51] Int. Cl.4 .............................................. G01D 9/00
[52] U.S. Cl. ................................. 346/33 R; 346/1.1; 346/136; 346/139 R; 346/140 R; 364/520; 400/126; 400/328; 400/354; 400/582
[58] Field of Search .................. 346/136, 139 R, 140, 346/75, 1.1, 33 R; 400/126, 328, 354, 582; 364/518, 519, 520

[56] References Cited

U.S. PATENT DOCUMENTS

| | | | |
|---|---|---|---|
| 3,430,256 | 2/1969 | Goodman | 346/34 X |
| 3,689,693 | 9/1972 | Cahill | 346/75 |
| 4,158,847 | 6/1979 | Heinzl | 346/140 |
| 4,223,323 | 9/1980 | Bader | 346/140 |
| 4,329,693 | 5/1982 | Goldschmidt | 346/136 X |
| 4,442,442 | 4/1984 | O'Dell | 346/136 |
| 4,452,136 | 6/1984 | Boynton | 400/124 X |
| 4,560,995 | 12/1985 | Suga | 346/136 |

*Primary Examiner*—Joseph W. Hartary
*Attorney, Agent, or Firm*—Jerry W. Mills; Roger N. Chauza

[57] ABSTRACT

A compact plotter is disclosed, having a small area in which a plurality of print heads (10) are laterally scanned to print impressions on the paper (14), and the paper (14) is incrementally advanced by an indexer (42) past the print heads (10). A paper travel encoder (36) measures the paper advancement. A computer 22 and a processor 26 are provided to coordinate the printing of pattern data stored in a data base (24) both with the movement of the print heads (10) and the advancement of the paper (14). The computer (22) allocates data from the data base (24) to be printed according to the amount of paper advancement. If the paper (14) is advanced more than a predefined amount, more data is allocated for printing than is actually printed. If the paper (14) is advanced less than the predefined amount, less data is allocated to be printed than is actually printed.

55 Claims, 20 Drawing Figures

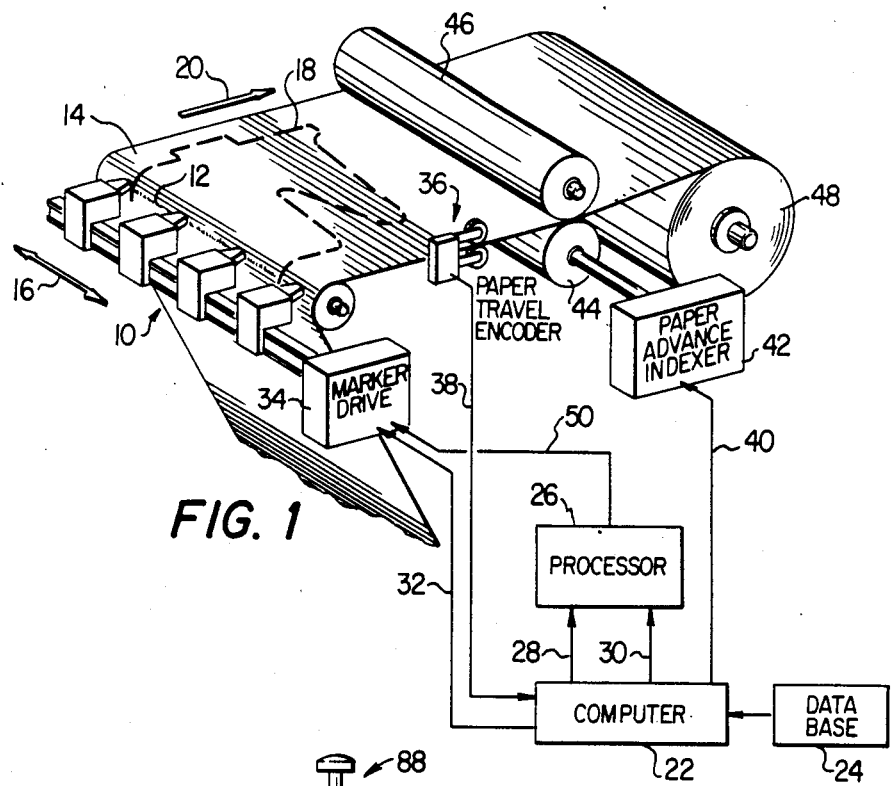
FIG. 1
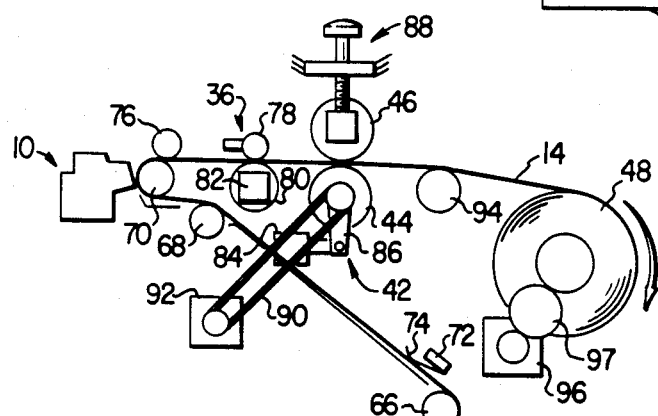
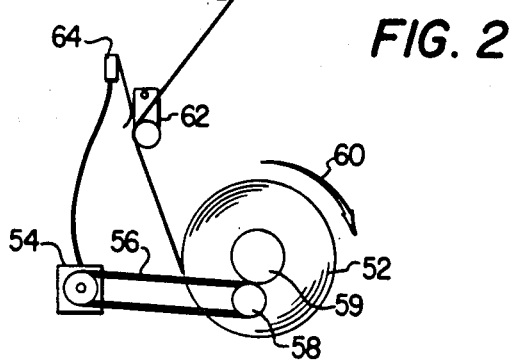
FIG. 2

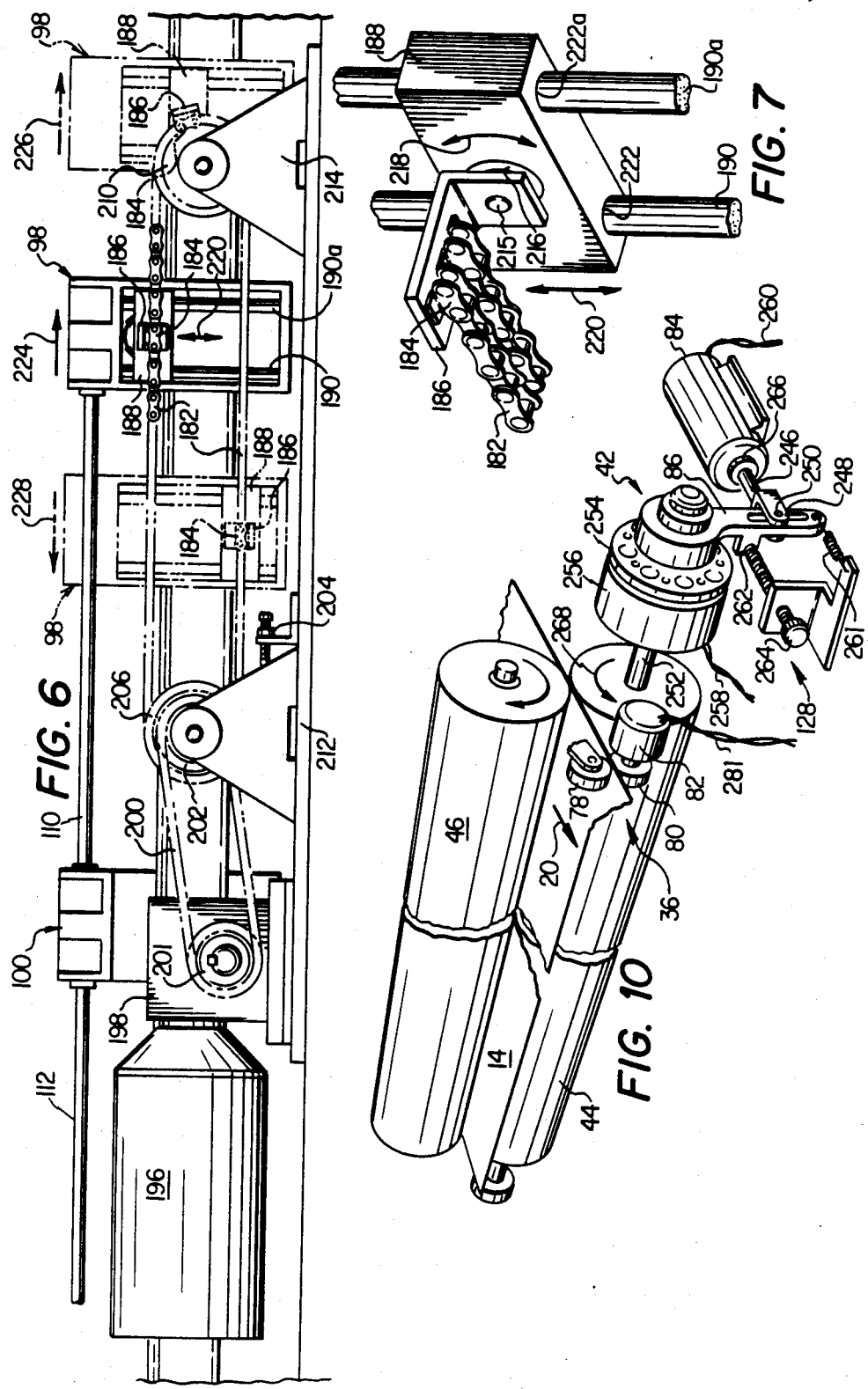

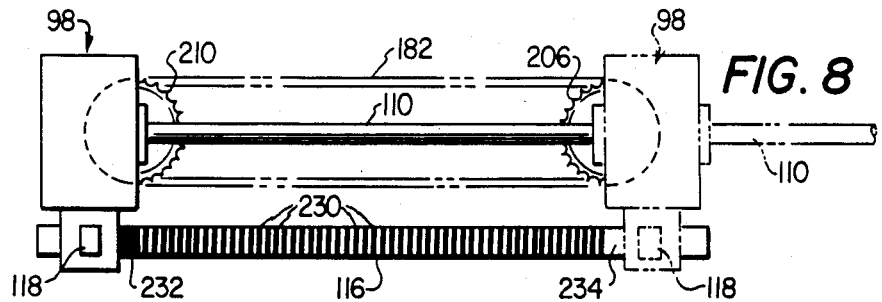
FIG. 8
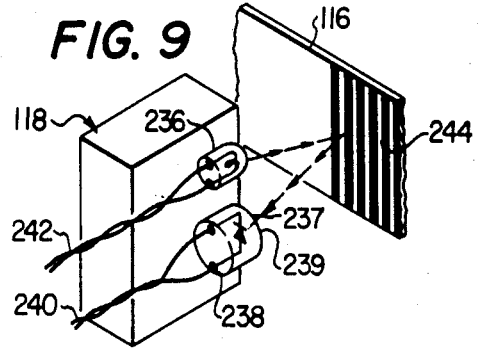
FIG. 9
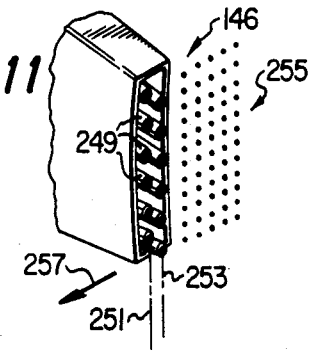
FIG. 11
FIG. 13
RETICLE SCALE
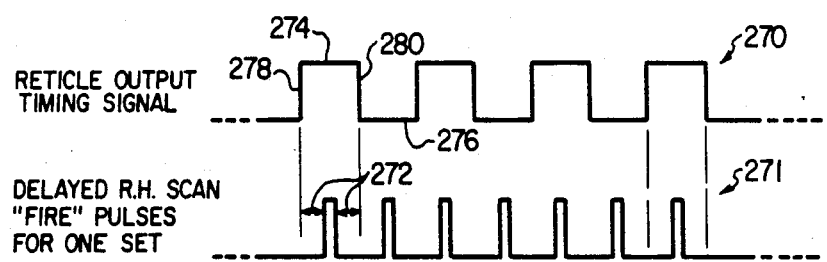
RETICLE OUTPUT TIMING SIGNAL
DELAYED R.H. SCAN "FIRE" PULSES FOR ONE SET
DELAYED L.H. SCAN "FIRE" PULSES FOR ONE SET
R.H. PLOT  
L.H. PLOT  

COMPACT PLOTTER FOR GENERATION OF ACCURATE PLOTTED IMAGES OF LONG LENGTH

TECHNICAL FIELD OF THE INVENTION

The present invention relates in general to X-Y plotters, and more particularly relates to plotters which coordinate print head movements with paper movements to generate patterns or designs of long length with high accuracy.

BACKGROUND OF THE INVENTION

Plotting devices are well known for the preparation of engineering drawings, geophysical representations, apparel patterns and markers (a nested array of patterns) and other pictorial representations on paper stock.

These plotting devices generally use either specific cut sheet paper sizes or operate with continuous paper rolls. In the former application the length of the plotted image is generally rather short, from a few inches to a few feet, and thus the error accumulation as a function of the length of the plot is limited. Another class of plotters using continuous rolls of paper, which is more related to the present invention, can generate plots of considerable length, from a few feet to many yards, and thus the accumulation of error as a function of plot length can become significant. Thus, it is an object of the present invention to provide a compact plotter which can generate long plot lengths without an accumulation of error.

Previously developed plotters capable of operating with continuous paper rolls have generally fallen into the categories of either flat bed (or table type) plotters or upright graphical plotters. The flat bed plotters are computerized for controlling a marking pen in an X-Y plane to reproduce a plotted image on a sheet of paper that is normally laying flat and maintained stationary on a large horizontal plotter table. Each incremental movement of the pen in both the X and Y directions is controlled by the computer and is driven by highly responsive servo systems. Since the plotted image is generated by having the pen actually draw the contour, the mechanism that drives the pen must have high speed and high acceleration capabilities in order for the plotter to have a sufficient throughput. Furthermore, if the length of the plotted image exceeds the length of the plotter table, a precision paper advance must be made in order to produce a clean area of paper upon which the plotted image is continued. Thus, prior flat bed plotters have been of substantial size in the horizontal plane and occupy a considerable amount of floor space. In addition, these plotting devices are expensive due to the complexity of the mechanisms required to drive the pen and to provide a precision paper advance.

Upright graphical plotters which are more closely related to the present invention have been developed wherein a marking head is reciprocated in a rectilinear path while the paper moves transversely thereto. In order to create accurate long length plots these devices have resorted to very sophisticated precision paper advance mechanisms or to special papers such as those types having an array of holes on each side of the paper along its entire length which in turn can mate with a sprocket driven device on the plotter. Thus, in previously developed upright plotters either the equipment has been very expensive due to their precision mechanisms or the paper required has been very expensive due to its special nature.

It may be seen from the foregoing that a need has arisen for a highly accurate upright plotting device that requires little floor space and that can accurately produce very long length plots with low cost, and nonsophisticated mechanisms for controlling paper movement and the motions of the print head.

SUMMARY OF THE INVENTION

In accordance with the present invention, an upright X-Y plotter is provided which substantially reduces or eliminates the shortcomings previously associated with prior plotting systems. In accordance with the present invention, the movement of paper stock from a supply roll is incrementally moved in one direction adjacent a plurality of ink marking print heads. The print heads are ganged together and are moved rectilinearly in a direction transverse to that of the paper stock. The plotter is housed in an upright cabinet and includes a paper carrier which incrementally scrolls the paper adjacent the print heads. A relatively small printing area is all that is necessary for printing pictorial or graphical indicia thereon.

In the preferred embodiment, four ink jet print heads reciprocate in a respective quadrant across the paper. The ink jets are computer controlled so as to provide appropriate marks or impressions to form a pattern in accordance with data stored in a data base. Each print head has twelve ink jets for simultaneously printing twelve bits of data. The data allocated to be printed from the data base after each incremental paper advancement is variable, and is controlled by the processor in accordance with a scheme which allows more data to be printed than allocated if paper advancement is greater than desired. In a similar manner, less data is printed than allocated if the paper moves a shorter distance.

Provided also is a paper travel gauge which very accurately measures the distance the paper has moved during each increment. The actual length of paper advancement is measured and compared with a desired or standard length of paper advancement. If the advancement falls within the standard length, then twelve bits of data are allocated and are transferred to the twelve ink jets of each print head for reproducing the design corresponding to the row being scanned. A data bit of a logic one causes the emission of a jet of ink, while a logic zero causes no emission of ink from the respective ink jet. In the event the paper has moved too far, thirteen bits of data from the data base are allocated. The twelfth and thirteenth bits are logically ORed and transferred to the twelfth ink jet for printing. On the other hand, if the paper has not moved far enough during the incremental move, eleven bits of data from the data base are allocated. However, twelve bits are sent to the print heads, the twelfth bit being a duplicate of the eleventh bit. With this arrangement, the resolution and accuracy of the print is not compromised by minor inaccuracies in the movement of the paper. With this arrangement, plot length inaccuracies of 0.1% or less can be achieved.

BRIEF DESCRIPTION OF THE DRAWINGS

Further features and advantages of the present invention will become apparent from an illustrative embodiment thereof, taken in conjunction with the accompanying drawings in which:

FIG. 1 illustrates the placement and movement of the print heads relative to the printing area of the paper, and also illustrates the control apparatus in block form;

FIG. 2 is a simplified diagram of the paper carrier which incrementally scrolls the paper through the printing area, from the supply roll to the take-up roll;

FIG. 6 is a back elevational view of the print head carriage and drive assembly, taken along line 6—6 of FIG. 5, illustrating the rectilinear reciprocating movement of the print heads;

FIG. 7 is an isometric view of the drive chain connection to the master print head carriage;

FIG. 8 is a front elevational view of the master print head printing quadrant, illustrating the reticle scale and reticle line sensor;

FIG. 9 is an isometric view of the reticle sensor and a portion of the reticle scale;

FIG. 10 is an isometric view of the paper advance and travel gauge mechanism for incrementally advancing the paper and measuring the travel thereof;

FIG. 11 is a frontal isometric view of an ink jet print head, illustrating the twelve ink jet nozzles;

FIG. 13 is a timing chart illustrating the relationship of the reticle strip bars, timing pulses and the plotted data;

DETAILED DESCRIPTION OF THE INVENTION

Figure 3:
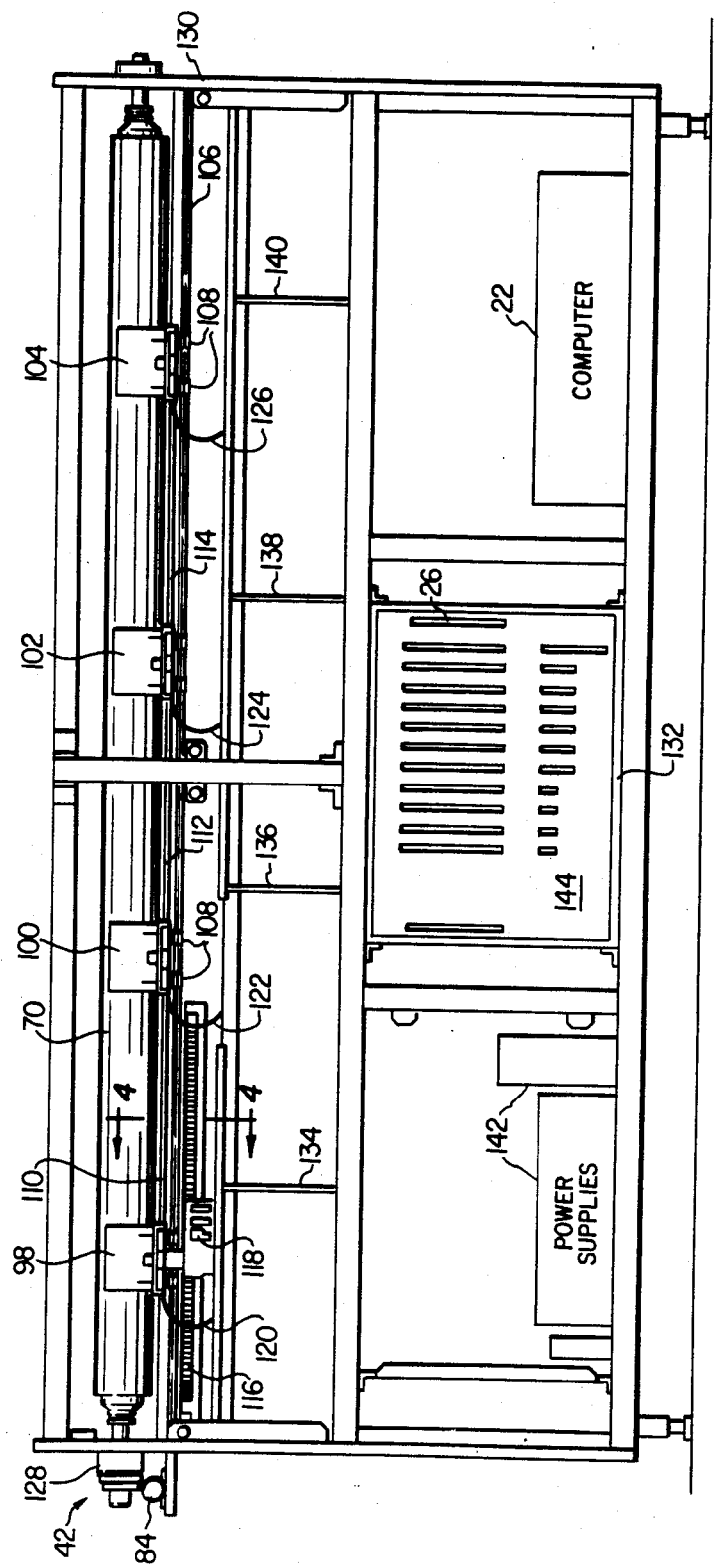
FIG. 3 is a front elevational view of the upright plotter, illustrating the relative position of the four print heads located adjacent the print roller.

The principles and concepts of the invention are best understood by referring first to FIG. 1 of the drawings. In accordance with the plotter of the invention, a plurality of ink print heads, shown generally as 10, are provided for printing information such as designs drawings or patterns on a paper medium 14. The print heads 10 are each spaced apart and scanned back and forth in a rectilinear direction 16 to deposit ink 12 on a respective quadrant of the paper 14. Each print head is capable of simultaneously depositing plural droplets of ink on the paper 14. Ink is deposited from a print head in its respective quadrant at locations which are dependent upon a design 18 to be printed. Between print head scans, the paper 14 is incrementally advanced in the direction of arrow 20 so that the subsequent scans of the print heads 10 produce an additional line or row of design 18.

The foregoing functions are carried out by apparatus in the functional blocks shown in FIG. 1. A computer 22 is provided, along with a data base 24, for providing overall control of the plotter to produce a desired design or pattern on the paper 14. The data base 24 stores digital data in a vector format which is representative of a particular pattern or design 18. Moreover, the data base 24 may be updated as desired with new or different patterns. The computer 22 converts the vector format data into scan format data, and couples the latter to a processor 26 on communication bus 28. The computer 22 also couples print commands to the processor 26 on communication bus 30. Line 32 is connected from the computer 22 to a marking drive unit 34 for enabling operation of the print heads 10. A paper travel encoder 36 measures the distance the paper 14 travels for each incremental move, and transmits this information on line 38 to the computer 22. Paper advance commands generated by the computer 22 are coupled by line 40 to a paper advance indexer 42 to effect an incremental advance of the paper 14. The paper advance indexer 42 is coupled to a paper drive roller 44 and is rotated a small angular distance to advance the paper 14 held against a drive roller 44 by a pinch roller 46. Paper is accumulated on take-up roll 48. The processor 26 is also coupled to the marker drive mechanism 34 by line 50 to provide "fire" commands to the print heads 10 for depositing ink impressions on the paper 14.

From the foregoing brief review, it should be appreciated that the computer 22 coordinates the electrical and mechanical apparatus of the plotter to cause the print heads 10 to deposit ink on the paper 14 at desired locations, and incrementally moves and measures the paper 14 between each print head scan. As a result, the pattern 18 is formed on the paper 14 in accordance with the data stored in the computer data base 24. It can also be appreciated from the foregoing that the printing area of the paper 14 is independent of the total pattern area, as the paper is incrementally advanced to whatever total length is required to reproduce the pattern or design.

The coordinated processing between the computer 22 and the processor 26 utilizes an algorithm which allocates data from the data base 24 to be printed in accordance with the amount of incremental paper advancement. The data base 24 is arranged to provide signals to each print head to permit the emission, if any, of ink droplets at a plurality of coordinates across the paper 14. In order to preserve the accuracy with which a pattern is reproduced, less data is used from the data base 24 in printing a scan across the paper width when the paper advancement is less than a predefined amount. However, because each print head must yet receive the prescribed amount of data with regard to the emission of plural ink droplets, a row of data in the data base 24 is duplicated to provide the prescribed amount of data. On the other hand, when the paper advancement is in excess of the predefined amount, additional data is used from the data base 24, and two data rows are logically combined into one row, thereby providing the prescribed amount of data for the print heads 10. In this manner, the pattern ends at a position at the bottom of the paper 14 where it would have ended if the incremental paper advancements were each of the predefined amount.

Paper Carrier

The path traversed by the paper 14 through the paper carrier is more clearly shown in FIG. 2, where like and corresponding elements are identified by the same reference character. A supply of paper 14 is provided to the plotter on paper supply roll 52. A paper supply drive 54 is coupled to the supply roll 52 by a chain 56 and a gear 58 in mesh with a gear 59 on the supply roll 52. On the occurrence of the need for more paper 14, the paper supply drive 54 operates for a predetermined period of time. The paper supply roll 52 is thus rotated in the direction of arrow 60, whereupon paper exits the roll and is routed over a paper tension actuator bar 62. The paper tension bar 62 is spring loaded (not shown) so that when an excess amount of paper is unwrapped from the supply roll 52, the paper tension bar 62 is moved to the left. On the other hand, as paper is incrementally advanced during the printing reproduction process, and the excess paper unwound from supply roll 52 is used, the paper tension bar 62 is moved to the right.

A paper supply actuator switch 64 is mechanically coupled to the tension bar 62 for detecting the movement of the tension bar 62 to the right. When the tension bar 62 moves to the right more than a predetermined amount, electrical contacts in the supply drive actuator switch 64 close, thereby completing a circuit to the paper supply drive 54. In this manner, the paper supply roll 52 is rotated, again providing an excess amount of paper, and thereby again moving the tension bar 62 to the left. Rollers 66 and 68 are idler rollers over which the paper is routed to the print roller 70. A "paper-out" switch 72 includes an arm 74 tensioned against the paper for detecting when the supply of paper is exhausted. The "paper-out" switch is coupled (not shown) to the computer so that printing is halted in an orderly manner, and corresponding visual indicators are lighted.

As noted in FIG. 2, the ink print heads 10 are disposed adjacent the print roller 70, with the paper passing therebetween. Therefore, because the marker heads 10 reciprocate only along a single axis, rather than in an X-Y plane as is conventional, very little space is required. A paper stabilizer roller 76 aids in keeping the paper 14 pulled tight over the print roller 70, thereby eliminating looseness of the paper in the print area which could result in printing distortion and inaccuracies.

The paper travel encoder 36 comprises a pair of rollers 78 and 80 between which the paper 14 is pulled by the paper advance indexer 42. Roller 80 provides rotational information to an encoder 82. The encoder 82 converts angular rotary input information to electrical pulses representative of the distance by which the paper 14 is pulled through the encoder rollers 78 and 80. The paper advance indexer 42 includes a solenoid 84 coupled to a drive roller arm 86 which is effective to rotate the drive roller 44 in a direction to advance the paper 14 a very short distance after each print head scan. The amount by which the paper 14 is compressed between the pinch roller 46 and paper drive roller 44 is adjusted by screw means 88. The paper drive roller 44 is also chain driven by a chain 90 to a slew feed drive motor 92. The slew feed drive motor 92 is manually energized when it is desired to advance large amounts of paper 14 quickly through the plotter system, such as before a plotting operation is begun, or after a design or pattern has been plotted.

After the paper 14 is advanced or indexed by the paper drive roller 44, it is directed over idler roller 94 and onto the take-up roll 48. A paper take-up drive motor 96 is coupled to the take-up roll 48 by a slip clutch 97 to rotate such roll and accumulate paper that has been advanced through the plotter system. The slip clutch 97 is of the adjustable type which is adjusted so that when a certain tension exists on the paper, the clutch will slip. Any overrunning of the take-up drive motor does not then tend to pull additional paper 14 through the drive and pinch rollers 44 and 46.

Print Head Transport Assembly

With reference now to FIG. 3, there is shown a frontal view of the upright plotter, constructed according to the invention. The ink print heads 10, collectively shown in FIG. 1, are identified in FIG. 3 as 98, 100, 102 and 104. Each marker head 98–104 is located to the front side of the print roller 70, and thus the only printing space required is that needed for the lateral movement of the print heads 98–104. Each print head 98–104 is laterally movable in a reciprocating manner, and in a rectilinear path on a V-track 106 and V-roller 108 arrangement. In addition, each print head 98–104 is spaced apart and rigidly connected to each other by three carriage bars 110, 112 and 114. It will be described in greater detail below the manner in which the master print head 98 is reciprocated, thereby reciprocating the other print heads 100–104 connected thereto by the carriage bars 110, 112 and 114.

Print head 98 is denoted the master as it receives the primary reciprocating drive motion, and also because it is located adjacent a reticle scale 116. The reticle scale 116 is essentially a finely graduated scale of dark vertical lines on a light background. The master print head 98 includes an optical reflection sensor 118 which senses the reticle lines as the print head 98 moves thereacross. This provides an indication of the exact lateral location of each print head (98–104) with respect to its printing quadrant. The number of reticle lines per unit length thereof defines the lateral resolution and accuracy for printing patterns or designs.

In accordance with the invention, the print heads 98–104 are of the ink jet type having a plurality of vertically aligned orifices or nozzles, each ejecting a small droplet of ink outwardly onto the paper in response to an electrical signal. Each ink jet orifice is associated with an electrical signal for controlling whether or not ink should be emitted onto the paper. A trailing flat ribbon cable 120–126 is connected to each respective marker head 98–104 to provide a flexible conductor for carrying signals to the print heads 98–104 during the reciprocating motion thereof.

Depicted also in FIG. 3 is the paper advance indexer 42 for incrementally advancing paper 14 around the print roller 70. The indexer 42 includes the solenoid 84 coupled to an electric clutch 128. The electric clutch 128 is energized during operation of the solenoid 84 in one direction, and released when the solenoid 84 and arm pivot in the other direction. The drive roller 44 (not shown in FIG. 3) is connected to one plate of the electric clutch 128, and is thereby rotated a prescribed angular displacement during actuation of the solenoid 84. The paper advance indexer 42 will be described in more detail below.

The electrical and mechanical apparatus of the plotter is housed in an upright cabinet 130 mounted. The electrical apparatus is located in a printed wireboard rack 132 within the cabinet 130, and under the respective marker heads 98–104 are four corresponding print head driver circuit assemblies 134–140. The driver circuits 134–140 include circuitry for controlling each print head ink jet orifice so that a pattern or design can be reproduced on the paper 14.

Also within the plotter cabinet 130 is the computer 22, power supplies 142 and electronics 144 including the processor 26. To be discussed in more detail below, the computer 22 and electronics 144 coordinate the reciprocating movement and ink jet printing of the print heads 98-104 with the indexing of the drive roller 44 to thereby provide a compact plotter capable of reproducing large designs or patterns.

Figure 4:
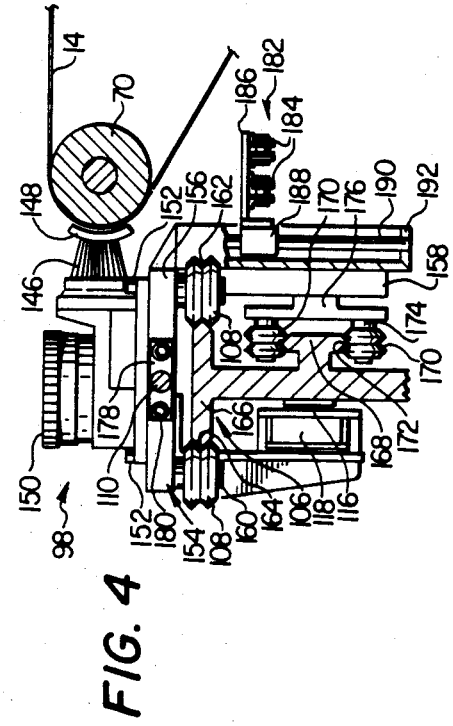
FIG. 4 is a cross-sectional view of the print head track assembly, taken along line 4—4 of FIG. 3.

In FIG. 4 there is illustrated the track arrangement for moving the print heads 98-104 in a reciprocating manner. Specifically shown is print head 98 movably fixed to the transport V-track 106 in proximity to the paper 14 routed around print roller 70. The print head 98 is of the type having a plurality of ink jets 146, each adapted for emitting a jet or droplet of ink on a nearby surface, such as paper 14. In the preferred embodiment of the invention, print heads suitable for the described operation include piezoceramic tubes as ink jets 146, and can be obtained from Siemens as OEM Print Head, Model A44. Provided also with the marker head 100 is a wiper cap 148 for preventing nozzle clogging and air bubble formation in the ink system. An ink cartridge or reservoir 150 is located atop the print head 98 and provides a constant supply of ink to the head. Provisions (not shown) are also made for signalling the computer when the ink cartridge 150 is low or out of ink.

The print head 98 is mounted by hardware 152 to a carriage angle base 154. The base 154 includes elongated holes for adjustment of the print head 98 with respect to the print roller 70. The angle base 154 includes a horizontal part 156 and a vertical part 158. Mounted on the horizontal part 156 are four V-groove rollers 108, two of which are shown in FIG. 4. Each V-groove roller 108 is rotatable on a respective stud 160 secured to the horizontal base part 156. Each stud 160 is of the eccentric type which allows adjustment about the track 106. The V-groove 162 of each roller 108 engages about an outwardly projected V-part 164 of horizontal track 166. The four V-groove rollers 108 engaging on opposing sides of the horizontal V-track 166 allows a nonwobbling and rectilinear motion of the four print heads 98-104 along track assembly 106. The roller studs 160 are made adjustable, as noted, so that only a light contact pressure exists between the V-grooves 164 of the rollers 108, and the V-projections 164 of the horizontal track 166.

Integral with the transport track 106 is the vertical V-track 168. Four V-groove rollers 170 engage the V-projections 172 of the vertical track 168. Each V-groove roller 170 is fixed by a respective eccentric stud 174 to a mounting plate 176 which, in turn, is fixed to the vertical part of the carriage base 154. With this arrangement, the print head 98 is stabilized vertically, but allowed to move in a rectilinear path laterally and adjacent the print roller 70. The carriage base 154 of the print head 98 is connected to an adjacent print head by a carriage bar 110. The carriage bar 110 includes an end plate 178 secured to the horizontal part 156 of the carriage base 154 by bolts 180. Thus, when one print head is driven, the carriage bars (110, 112 and 114 in FIG. 3) cause all the print heads to be simultaneously moved in the same direction and in the same rectilinear path.

The master print head 98 receives its drive from a double drive chain 182, and imparts this drive by the carriage bar 110 to the other three print heads 100-104. The links 184 of the double drive chain 182 are mounted to a bracket 186 which, in turn, is bearing mounted within a block 188. Block 188 includes a pair of vertical bores (not shown) for sliding up and down on rods 190. Rods 190 are vertically fixed within a housing 192 which is integral with the vertical part 158 of the carriage base 154. The details and operation of the drive for the master print head 98 is illustrated in FIGS. 6 and 7.

Figure 5:
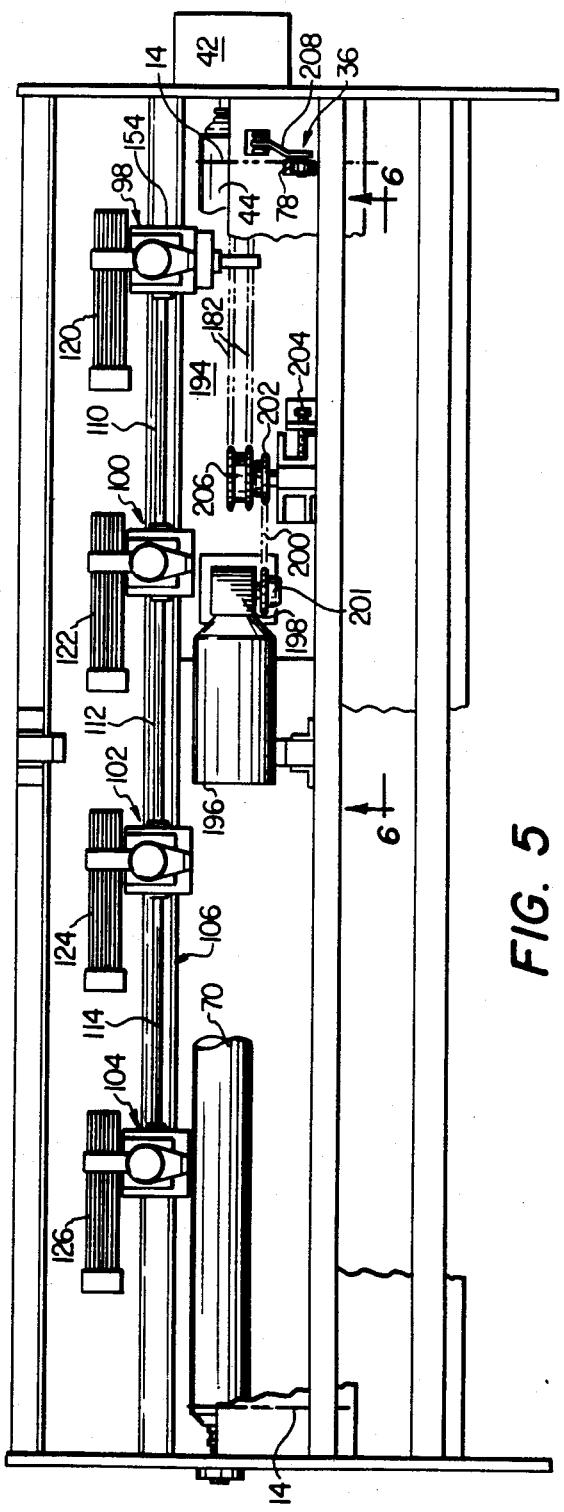
FIG. 5 is a top plan view of the plotter according to the invention, illustrating the print head carriage and drive assembly.

With brief reference to FIG. 5, there is illustrated a top view of the print head drive assembly 194, constructed according to the invention. A constant speed 1800 RPM electric motor 196 provides the primary power for driving the master print head carriage base 154. The motor 196 is coupled to a 5:1 gear reduction 198 which, in turn, is coupled by a chain 200 to a sprocket assembly 202. The sprocket assembly 202 includes an adjustment means 204 for adjusting the tension of chain 182. The drive sprocket 202 drives a double sprocket 206 which carries the double drive chain 182. As noted above, double chain 182 is fixed to the carriage base 154 of the master print head 98.

Also noted in FIG. 5 is the idler roller 78 of the paper travel encoder 36. The idler roller 78 is coupled to tension bar 208 so that the roller 78 is biased downwardly and the paper 14 is held firmly against the encoder roller 80 (also shown in FIG. 10) disposed directly below the idler roller 78. In this manner, the paper travel encoder 82 is capable of providing an indication of the paper travel by the angular displacement imparted to the encoder roller 80.

With reference now to FIGS. 6 and 7, the print head drive assembly 194 is shown in greater detail. In FIG. 6, the double drive chain 182 is indirectly driven by motor 196 and gear box 198 through chain 200, and about sprocket wheel 202 which is mounted on the same shaft as sprocket wheel 206. Double sprocket wheel 210 is anchored to a drive assembly frame 212 by bracket 214. Each link of the double drive chain 182 thereby traverses a somewhat oval path around double sprocket wheels 206 and 210. In the preferred form on the invention, double drive chain 182 travels at a linear speed of about 47 inches per second. It is well within the ambit of those skilled in the art to select an electric motor 196, a gear reduction 198 and sprocket wheels of suitable diameter to achieve the noted double drive chain speed. It should be appreciated that since the links 184 of double drive chain 182 are mechanically connected to the master print head carriage 154, and indirectly by means of carriage bars 110-114 to each print head 98-104, all print heads traverse a lateral reciprocating path with the same velocity as that of the double drive chain 182. The relationship between the travel of the double drive chain 182 and the printing of each print head 98-104 within its respective quadrant, will be described more thoroughly below.

In FIGS. 6 and 7, the drive chain links 184 are shown fastened by bolts, or other suitable means, to the bracket 186. Bracket 186 is attached by welding to drive pin 215. The drive pin 215 is inserted in the bore of bearing 216 mounted in block 188. More specifically, the bearing 216 has the outer race thereof fixed to the block 188, and the inner race attached to the chain link bracket 186 by means of drive pin 215. Of course, the inner and outer races of the bearing 216 are rotatable with respect to each other by needle or ball bearings. With this construction, the chain link bracket 186 is rotatable in the direction, shown by arrow 218, within block 188. Thus, as the drive chain links 184 traverse the oval path of the double chain drive 182, the chain link bracket 186 and associated drive pin 215 rotate within bearing 216 in block 188. Moreover, because of the oval path traversed by the double chain 182, block 188 is reciprocated up and down on guide rods 190 and 190a in the direction shown by arrow 220. Block 188 includes a pair of spaced-apart bores 222 and 222a for for slideably receiving therein the guide rods 190 and 190a.

The reciprocating path of master print head 98 is shown in various positions in FIG. 6 as the double chain 182 traverses its oval path. Specifically, the master print head 98 shown in solid lines, is shown traveling in the direction of arrow 224. The chain link bracket 186 is disposed above the link 184 when traveling in direction 224. As the master print head 98 is pulled to the rightmost position, shown in phantom in FIG. 6, the chain link bracket 186 is rotated with respect to block 188 as the links 184 are pulled around and downwardly by the double sprocket 210. With the master print head 98 shown in position corresponding to arrow 226, the velocity thereof is minimal, as the print head 98 is about to reverse directions. When so reversed in direction, the double chain 182 pulls the master print head 98 in the direction shown by arrow 228. As noted by the master print head 98 shown in phantom, the chain link bracket 186 is disposed below the chain links 184, and thus is reversed from its position shown in solid lines.

For the foregoing, the master print head 98 is reciprocated back and forth on the V-track assembly adjacent the paper, but at a distance of only about one fourth the width of the paper 14. The other print heads 100-104, being connected by carriage rods 110-114, are similarly reciprocally driven in quadrants adjacent respective remaining portions of the paper width. With this arrangement, at least one print head is positionable to deposit ink on a desired location along the width of the paper.

In FIG. 8, a front view of the master print head 98 is shown, together with its relationship to the reticle scale 116. As noted above, reticle sensor 118 is mounted to the master print head 98 and moves with the print head 98 across the reticle scale 116. The reticle scale 116 includes a plurality of closely spaced dark lines 230 against a lighter background. The lines 230 are of a width and spacing which determines the accuracy of the lateral position of the master marker head 98. To be described in more detail below, the reticle sensor 118 provides an output pulse for the beginning and ending of each dark line 230 encountered as the master print head 98 moves in a direction to the right, or to the left. Importantly, the left end of the reticle scale 116 includes a large dark area 232 which is sensed by the sensor 118 and identifies the left-hand position of the master print head 98. Conversely, the right-hand side of the reticle scale 116 includes a light area 234 which is sensed by the sensor 118 and identifies the location of the master print head 98 in its extreme right position, as shown in phantom.

It is also important to realize that the width of the lined part of the reticle scale 116 is somewhat shorter than the total lateral travel range of the master print head 98. The reason for this is that near the end points of the print head travel range, the lateral velocity of the print head 98 is either increasing or decreasing, as the double drive chain 182 is being pulled around sprockets 206 or 210. This is in contrast with a majority of the reciprocating movement of the print head 98 where the velocity is constant. With this arrangement, the starting points of the position determining apparatus essentially begin where the vertical lines 230 of the reticle scale 116 start and end, which positions are well within the constant lateral velocity range of the master print head 98. Typically, the usable width of the reticle scale 116 is 19½ inches. The effective printing width of a print head is 18 inches which can be moved left or right within the 19½ inches of usable vertical width to provide margin adjustments. This margin setting is under computer control. The overall width of all four heads is 72 inches. There is a 1½ inch overlap of printing area between adjacent print heads to assure that a design or pattern is continuous between printing quadrants.

In accordance with another feature of the invention, the provision of four print heads 98-104 allows an increased print speed over that of one print head alone. While the principles of the invention may be applied to a plotter having a single print head, the four-head plotter permits the full width of the paper 14 to be printed in one fourth the time. This advantage is realized by moving each print head 98-104 across only one fourth the paper width. Moreover, printing is effected on both the right hand scan, and the left hand scan. Obviously, additional throughput improvements can be attained by increasing the number of print heads beyond four, to say, six.

Reticle Sensor

FIG. 9 illustrates the operation of the reticle sensor 118. While not shown to scale, the reticle sensor 118 is spaced from the reticle scale 116 somewhat less than 0.2 inches. This small spacing prevents ambient light from affecting the detection of the dark vertical lines 230 from the white background of the reticle scale 116. Formed within the reticle sensor 118 is a light source 236 which focuses light through a lens 237 upon the reticle scale 116. The light is directed at the reticle scale 116 so that the reflected light from the white background is received by a photoreceiver 238. The photoreceiver is in the nature of a photodiode which provides a conducting path through conductors 240 when light falls upon the sensor 238. A lens 237 aids in focusing light reflected from the reticle scale 116. Light source 236 is of the type capable of producing a narrow beam of light, preferably narrower than the spacing between adjacent vertical dark lines 230 of the reticle scale 116.

A reticle sensing unit 118 suitable for the operation described is known as a High Resolution Optical Reflection Sensor, manufactured by the Hewlett Packard Company, and identified as Model HBCS-1100. The noted sensor can distinguish dark lines of 0.0118 inch width and spacing. With this arrangement, when the light source 236 is provided with power supplied to conductors 242, the resulting beam is directed to the reticle scale 116. If the instantaneous print head position during movement is such that no vertical dark line 230 is on the point of reflection 244, light will be reflected to the diode sensor 238, whereupon a circuit will be completed through conductors 240. If, on the other hand, the master print head 98 has moved to a position such that the light source 236 of the reticle sensor 118 is shining on a dark vertical line 230, no reflection of light will appear on the diode sensor 238. In this instance, a circuit will not be completed through conductors 240, thereby indicating the presence of a dark vertical line. It can be seen that as the reticle sensor 118 scans back and forth, in correspondence with that of the master print head 98, a plurality of electrical pulses will appear on conductors 240. These pulses can amplified, shaped and counted to determine the exact location of the master print head 98 during its scan. Since all print heads 98–104 are connected together, all positions are known.

When the reticle sensor 188 scans across the large dark section 232, the resulting nonconductive state of the diode sensor 238 indicates the leftmost position of the master print head 98. The large light area 234 causes a corresponding period of time in which the diode sensor 238 is conductive, and thereby indicates the rightmost position of the master print head 98.

As noted above, each print head 98–104 is capable of printing a line of information on the paper during the right-hand scan, as well as on the return left-hand scan. More importantly, the printing of each print head is controlled so that where one print head stops printing at the end of its scan, an adjacent print head can pick up the printing so that a single continuous lines can be made on the paper 14 on a single scan of the print heads. In essence, to form a single line across the width of the paper, each print head 98–104 will print one-fourth of the line. The concepts and principles of the invention may be utilized in developing similar systems with other numbers of print heads.

Paper Advance Indexer

In a coordinated movement between each scan of the print heads 10, the paper 14 is advanced in a transverse direction. FIG. 10 illustrates the paper advance indexer 42 according to the preferred form of the invention. The paper advancing indexer 42 comprises the electrically actuated solenoid 84, with a plunger 246 having a clevis 248 fixed to the end thereof. The clevis 248 is attached by a pin 250 to the clutch crank arm 86 which, in turn, is freely rotatable on a drive roller shaft 252. The electrical clutch 128 has a first plate 254 fixed to the crank arm 86, and a second clutch plate 256 which is fixed to the drive roller shaft 252. Within the second clutch plate 256, there is an electrical winding (not shown) which is energized by causing current to flow through conductors 258, whereupon the magnetic attraction of the first plate 254 and the second plate 256 results in the engagement of the clutch plates. When engaged, the clutch 128 couples the angular motion of the crank arm 86 to the drive roller 44. The solenoid 84 includes a winding (not shown) actuated by current in conductors 260.

When it is desired to advance the drive roller 44, and thereby advance the paper 14 in the direction of arrow 20, the signals energizing solenoid conductors 260 and clutch conductors 258 are timed in the following manner. Clutch 128 is first energized so that there is a direct connection between the crank arm 86 and the drive roller shaft 252. Next, the solenoid conductors 260 are energized, whereupon the plunger 246 is pulled inward until stop ring 266 abuts against the solenoid 84. Current flow through the solenoid conductors 260 is then halted, and the solenoid 84 is deenergized. The clutch 128 is also deenergized. A return spring 261 is connected between the adjusting screw bracket and the clevis 250 for returning the plunger 246 out of the solenoid 84. The plunger 246 is returned to a point where the adjusting screw 264 abuts against a tab 262 on crank arm 86. The return of the solenoid plunger 246 rotates the crank arm 86 counterclockwise, but since the clutch 128 is not engaged, the paper roll is not rotated in the reverse direction. With this arrangement, when the solenoid 84 and the clutch 128 are energized in the timed sequence, the drive roller 44 is indexed a predetermined amount in the direction shown by arrow 268.

The amount by which the drive roller 44 is angularly rotated is adjusted by rotating adjustment screw 264. To provide larger increments of paper advancement, the screw 264 is rotated so that it is moved away from the crank abutting tab 262. For shorter paper increments, the screw 264 is rotated in the opposite direction. Other paper advancing arrangements may be constructed by those skilled in the art. Because of the mass of the drive roller 44 and the pinch roller 46, and with the existence of any slip within the clutch 128, exact and precise increments of the paper 14 are difficult to attain. Moreover, any wear within the solenoid travel increases the discrepancy with which the paper can be accurately advanced.

Paper Travel Encoder

According to the invention, a paper travel encoder 36 is included to provide a highly accurate determination of the extent by which the paper 14 has been advanced by the indexer 42. The pinch roller 78 is spring biased in a manner (not shown) and in a direction toward the roller 80 of the encoder 82. The paper 14 is thereby compressed between the rollers 78 and 80, and any relative movement of the paper 14 causes a corresponding rotation of both such rollers. When the encoder roller 80 is rotated, an electrical output is produced on output conductors 281. More particularly, encoder 82 is of the type which produces a predetermined number of electrical pulses on conductors 281 in accordance with the amount by which roller 80 has been rotated. The measurement of very small increments of movement of the paper 14 by the indexer 42 can thus be attained. Encoders of the type described are commercially available from Encoder Products, Co., Sandpoint, Idaho, and are identified as Accu-Coder, Series 700, Model 715-2. Paper increments in the neighborhood of 0.14 inch are easily detectable by the encoder 82. As a result of this incremental advancement, the encoder 82 produces about twenty two electrical pulses on conductors 281.

The foregoing constitutes the mechanical apparatus providing a highly compact plotter which can produce designs or patterns with a high degree of precision. The mechanical apparatus described is controlled by the computer 22, processor 26 and associated circuitry, whereby all apparatus is coordinated such that a pattern or design is accurately reproduced in accordance with the data stored in the data base 24.

Ink Jet Nozzles

The accuracy with which the plotter of the present invention reproduces designs or patterns is further enhanced by adjusting the matter printed by the twelve ink jets of each print head 98–104 according to whether the paper 14 was advanced a little too far, or not far enough. As noted above, the length by which the paper moves during each incremental advance is very accurately measured by the paper travel encoder 36, and the adjustment of the printed matter is accomplished by manipulation of the stored data to be printed before the actual printing by the twelve jets in each print head. The adjustment of the stored data will be made more clear by referring first to FIG. 11 which illustrates the nozzle configuration of each print head.

Each print head 98–104 is of the type including twelve piezoceramic ink jets 146, with nozzles 249.

More specifically, the group of ink jets 146 is arranged in two staggered rows of six jets. Each ink jet row, designated by dashed lines 251 and 253, are laterally spaced apart about 0.021 inches. As noted above, each ink jet 146 is separately controlled so that any combination of jets can be actuated in response to a logic signal to emit a drop of ink on the paper 14. Moreover, the described print head is of the type which is pulsed, and therefore a steady stream of ink cannot be emitted from the jet 146. As will be described more thoroughly below, the nozzle printing rate is associated with the reticle scale 116 which produces a series of pulses as the sensor 118 is scanned thereacross. An ink jet 146 can be activated on encountering both the beginning and end of a dark line 230. Thus, because the reticle dark lines 230 are about 0.0118 inch wide, the ink jet 146 has a maximum jetting rate of one droplet per 0.0118 inch. FIG. 11 illustrates a printing pattern 255 as a result of the firing of each ink jet nozzle 249 at the maximum rate. With all ink jet nozzles 249 ejecting ink droplets, a line height of 0.1417 inch is produced. The ink jet nozzles 249 are illustrated moving in the direction of arrow 257.

From the foregoing, it should be realized that if it is desired to print a fine horizontal line, only one ink jet nozzle 249 would be continuously pulsed as the print head moves laterally adjacent the paper 14. On the other hand, when it is desired to print a single vertical line, all twelve ink jet nozzles 249 would be activated once during a lateral scan. When printing lines having vertical components, the spaced-apart double row nature of the ink jet nozzles 249 must be taken into consideration. Therefore, in order to print a vertical line as the ink jet nozzle 249 is moving in the direction of arrow 257, nozzle row 251 must first be activated, and then after the print head has moved about 0.021 inch, the second nozzle row 253 is fired. In this manner, the droplets of ink will be vertically aligned, thereby printing the desired line. The amount of delay necessary between the firing of the first nozzle row 251 and the second nozzle row 253 can be calculated by noting that the print head 98 moves with a lateral velocity of 47 inches per second. Therefore, the time required for the print head 98 to travel 0.021inch is about 447 microseconds.

Data Base Arrangement And Allocation

For each pattern or design to be reproduced by the plotter, the data base 24 includes data which is translated from the vector format into a scan format. In the scan format there is associated with each scan of the print heads 98-104 columns of data to be printed by the nozzles 249 at each location corresponding to the reticle scale marks. Pattern or design data is available via the local area network in the vector format form. This type of data format is conventionally used for moving an ink pen from one X-Y coordinate to another on a large flatbed type of plotter. Instituted within the computer 22 is an algorithm for converting the vector format data of a design or pattern into data of the scan type format. It is to be noted that with the large flatbed type of plotter, the ink pen is moved in simultaneous X and Y directions. With the present invention, however, the print heads 98-104 are scanned across the paper while the paper is stationary. After each left or right scan the paper is incremented. As noted above, the increment is preferably about 0.1417 inch.

The conversion of vector format data into scan format data is accomplished in accordance with the well-known Bresenham's algorithm. The algorithm is fully disclosed in *Fundamentals of Interactive Computer Graphics*, by J. D. Foley and A. Van Dam.

The scan format data is stored in a sequential manner in the data base 24 in the order in which it will be retrieved and utilized during each scan of the print heads 98-104. In this manner, the bits of data are arranged so as to be retrieved in an orderly manner to reproduce the design on the paper. This, of course, assumes that the paper is correctly advanced before each scan. For example, if a vertical line were to be printed along the length of the paper, twelve bits of data would be retrieved from the data base for each scan so that all twelve ink jet nozzles could be activated at a particular lateral position. Moreover, it is assumed in this example that the first data bit is to start at a particular position at the top of the paper 14, and the last data bit corresponding to the design is to end at a predetermined point at the bottom of the paper 14. It can be seen that if each time the paper were advanced the increment was too short, the length of the plotted image would be too short. On the other hand, if each paper increment were too long, the plotted image would be too long.

Therefore, with the foregoing algorithm, when the paper advancement falls short of the ideal paper increment, only eleven data bits are retrieved from the data base 24. In this manner, the left-over data bit will be the first bit of the next group of bits printed on the next scan. The data is therefore effectively "stretched" so that the shortness of the paper increment is accommodated in order to end the plotted image when the proper length of paper has been reached. On the other hand, when the length of paper increment is greater than the ideal incremental length, thirteen data bits are retrieved from the base and compressed by the logical OR function, and printed as twelve bits. In this manner, when proper length of the plotted image is reached, the data base will be exhausted and no data bits will be left over.

Accordingly, provisions are made for adjusting the plotting data in accordance with the inaccuracy with which the paper has been advanced. FIGS. 12-16 illustrate the principle underlying this adjustment of data. First, and to be described in more detail below, data is retrieved from the data base 24 in advance of printing on the paper 14. In this manner, while one printing scan is occurring, the print data for the next scan is being computed and arranged, together with the indication whether an adjustment need be made because of paper advance inaccuracy.

Figure 12:
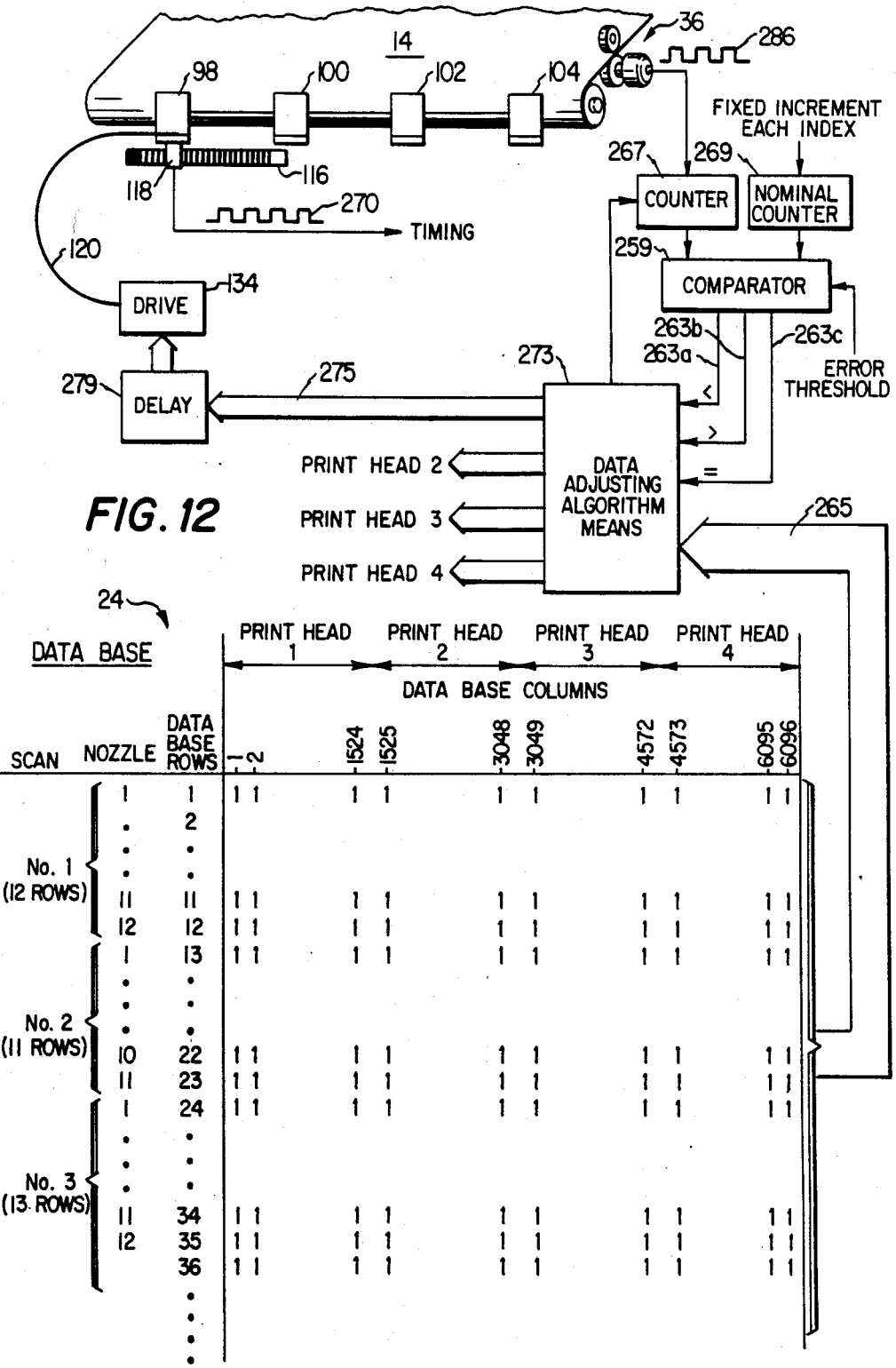
FIG. 12 illustrates the coordination between the paper advancement and the print head fire timing, and the allocation of data transferred to the print heads.

FIG. 12 is a simplified diagramatic illustration showing equivalent electrical and mechanical apparatus involved in reproducing a pattern according to data stored in the data base 24. In practice, the operations are carried out by software routines in the computer 22 and the processor 26. More particularly, there is illustrated the manner in which the printing data is adjusted to compensate for differences in the length of paper advance increments. Within the control complex portion of the plotter, there is provided a comparator 259 for comparing the digital count of a counter 267 with that of a nominal count 269. The counter stores the accumulated count of the pulses generated by the paper travel encoder 36. The three outputs 263a, b and c of the comparator 259 are coupled to a data adjusting algorithm means 273, which also includes an input 265 for retrieving data stored in the data base 24. Comparator output 263a indicates that the counter output is less than the nominal count 269, i.e., an indication that the cumulative paper advancement is less than desired. Comparator output 263b indicates that the counter output is greater than the nominal count 269, i.e., an indication that the cumulative paper advancement is greater than desired. Lastly, comparator output 263c signifies that the difference between the counter output and the nominal count 269 is less than an allowed threshold value, i.e., an indication that the paper advancement is within acceptable limits and no data adjustment is necessary.

The data adjusting algorithm means 273 is provided with four twelve-conductor output buses, each associated with one of the four print heads. Output bus 275 denotes the bus associated with driving the twelve nozzles of the master print head 98. The output bus 275 is coupled to a delay circuit 279 before being input to the driver circuit 134 associated with the master print head 98. The driver circuit 134 provides the "fire" commands to the respective nozzles of the master print head 98 through the travelling flat ribbon cable 120. The output of the reticle sensor 118 provides timing pulses for the processor complex. In addition, the reticle sensor timing pulses 270 segment the width of the paper into a plurality of columns. In a corresponding manner, the incremental advancement of the paper 14 by the paper indexer 42 effectively segments the paper into a plurality of rows.

The data base 24 is shown with similar columns and rows, after having been converted from the vector format to the scan format. Particularly, the data base 24 shown in FIG. 12 includes 6096 columns of information which are printable across the width of the paper. Data base columns 1–1524 correspond to the data to be printed by the master print head 98. Columns 1525–3048 correspond to the data to be printed by the second print head 100. Data base columns 3049–4572, and columns 4573–6096 correspond to data to be printed respectively by the third and fourth print heads 102 and 104. The data base 24 is shown for purposes of clarity with all logic ones stored therein. A logic one stored at a particular location in the data base 24 would result in the emission of ink by one of the nozzles of a particular print head, at a particular row and column coordinate on the paper 14. A logic zero would represent the absence of the firing of an ink jet nozzle, and thus the corresponding absence of the emission of a droplet of ink. It is to be understood, however, for conventional designs, patterns or drawings where there is substantially less inked area than noninked area, the data base would have stored therein substantially more logic zeros than ones.

Arranged vertically in the data base 24 shown in FIG. 12, are the rows of data which can be coupled to the ink jet nozzles for printing. For example, rows 1–12 may be coupled to respective ink jets nozzles 1–12 of each print head 98–104 for printing during the first scan. For a better understanding of the operation of the plotter according to the invention, the structure shown in FIG. 12 will be described in connection with a print scan occurring after a paper advance increment of the desired length; secondly with a paper advance increment less than the desired increment, and thirdly a printing scan associated with an advance increment longer than the desired increment. Since the initial print scan of a pattern is not preceded by other plotted impressions, the length of paper advance preceding such first plotting scan is irrelevant. Therefore, the first printing scan is considered to be preceded by an advance of the correct increment. Comparator output "equal to" conductor 263c thus signals the data adjusting algorithm means 264 of such condition. Accordingly, the data adjusting algorithm means 273 reads rows 1–12 of data from the data base 24 and couples the data to corresponding nozzles 1–12 of the respective print heads 98–104.

A delay is provided by circuit 279 for delaying all the data transmitted to the print heads 98–104. The delay is necessary to maintain vertical registry of plotted impressions irrespective of whether the scan is a right-hand or left-hand scan. Because the timing of the plotter system is synchronized with the transitions of the reticle sensor output pulses, it is necessary to make the actual plotting of the ink coincident with the center of the reticle output timing pulse.

Brief reference is had to FIG. 13 which illustrates the delay for synchronizing printing with regard to left and right print head scans. Assuming the printing of the pattern in accordance with the data stored in the exemplary data base 24, there will be plotted an ink impression at every column and row coordinate on the paper 14. The reticle lines or bars 230 are shown coincident with the reticle output timing signal 270. The delay incurred by circuit 279 is shown in connection with the delayed right-hand scan fire pulses 271, and is illustrated by dimension 272. As a result, the fire pulses are centered with respect to both the logic high portion 274 of the reticle output timing signal 270, and the logic low portion 276 of the timing signal 270.

The ink impressions 277 applied to the paper 14 are therefore centered with respect to the logic high and low portions of the reticle output timing signal 270. Were it not for the delay period 272, the ink impression would be applied to the paper 14 at a time coincident substantially with the leading and trailing transition edges of the reticle output timing signal 270. The printing of data associated with a left-hand scan of the print heads 98–104 is represented in FIG. 13 as pulse train 282.

A delay 284 in applying the pulses 282 to the driver circuit 134 is provided again by delay circuit 279. The delay 284 for a left-hand scan is identical to the delay 272 associated with a right-hand scan. Moreover, the delays 272 and 284 are substantially one-half of the pulse width of either the logic high portion or logic low portion of the reticle output timing signal 270. It is understood that since the spacings between the reticle bars 230 is identical to the width of the reticle bar 230, the reticle timing signal 270 comprises a fifty percent duty cycle.

Certain idiosyncrasies of the plotter system may require a delay of the "fire" command pulses which is unequal to half a reticle output timing signal pulse 270. For example, the spacing between the ink jet nozzles 249 and the paper 14 encompasses another delay between the time in which an ink droplet is emitted, and the time it actually strikes the paper 14. This transit time of the ink droplet introduces an error in both the right and left-hand scan printing. This error is offset by decreasing the delay times 272 and 284 so that the sum of the transit delay of the ink droplet and the circuit delay 272 again centers the arrival of the ink droplet on the paper 14 with the center of the reticle output timing signal 270.

With reference to FIGS. 12 and 13, it can be seen the manner in which the reticle scale 116, and thus the reticle output timing signal 270 segments the width of the paper into columns. Also, and in connection with the print scan associated with the paper advancement of a desired increment, rows 1-12 of the data base 24 will be coupled to ink jet nozzles 1-12 of each print head 98-104 to reproduce the first scan of the design. Stated in another way, the data of data base rows 1-12 will generate "fire" commands for respective ink jet nozzles 1-12 of each print head to be printed in respective columns 1, 1525, 3049 and 4573. As each print head continues the scan within its quadrant, the remaining columns of data base rows 1-12 will be printed to complete scan number one. As noted, for paper increments of the desired length, twelve data bits (twelve rows) are allocated to be printed by the respective twelve nozzles of each print head 98-104.

After data rows 1-12 have been plotted according to scan number one, the paper 14 is incremented by the paper advance indexer 42. As a result of the paper movement, the paper travel encoder 36 outputs pulse train 286 to the counter 267. After counting the pulses, the counter output has a binary count which is representative of the total number of pulses output by the paper travel encoder 36 from the beginning of the plot to the current scan. The binary output of the counter 267 is compared with a binary number stored in the nominal count circuit 269. Because in the present example it is assumed that the incremental advancement of the paper is less than desired, the binary output of counter 267 will be less than that of the nominal count 269 by an amount that exceeds the allowed threshold value. Accordingly, comparator 259 will provide the data adjustment algorithm means 273 a signal on the "less than" conductor 263c and will increment the encoder pulse counter to adjust for the add-a-row correction being made. In accordance with the algorithm of the invention, and because the paper has been incremented less than desired, fewer rows of data will be allocated and used to print the next scan. As shown in the data base 24 of FIG. 12, eleven rows (rows 13-23) are allocated for plotting the line associated with scan number two. It is highly important to note that while only eleven rows of data have been allocated for use in printing, the data adjusting algorithm means 273 must couple twelve lines of information to the twelve ink jet nozzles of the print heads 98-104. Each ink jet nozzle must be fed either a binary zero or one to cause the respective nonprinting or printing of an ink droplet. Therefore, and in accordance with the algorithm, the eleventh row of data in the data base 24 is coupled by the data adjusting algorithm means 273 to both ink jet nozzles eleven and twelve of each print head 98-104.

Again, the paper advance indexer 42 provides another incremental advancement of the paper 14. In this instance, it is assumed that the incremental advancement is greater than the desired length by an amount that exceeds the allowed threshold value. Therefore, a greater number of pulses 286 will be output by the paper travel encoder 36, and counted by counter 267. The binary output of counter 267, in this case, will be greater than the nominal counter 269, whereupon the comparator 259 will provide an output on the "greater than" conductor 263b, and will decrement the encoder pulse counter to adjust for the delete-a-row correction being made. The data adjusting algorithm means 273 is thus signaled that since the paper 14 has been incremented a length greater than desired, a greater number of data base data rows will be allocated for printing. In the instant example, the next thirteen data rows, i.e., rows 24-36, will be allocated for use in plotting scan number three. However, since only twelve bits of information can be passed to each print head 98-104 to fire the twelve ink jet nozzles, the data adjusting algorithm means 273 merges the data information of row 36, the thirteenth data base row, with the information allocated to ink jet nozzles number twelve. The merging of data rows 35 and 36 is in the nature of a logical OR operation. The data adjusting algorithm means 273 therefore computes the logical OR of rows 35 and 36 for each column of the data base 24, and provides the result to the ink jet nozzle number twelve of each print head 98-104.

From the foregoing, it is seen that data from the data base is allocated in accordance with the length of paper advancement, such that a compression or stretching of the plotted matter does not occur as a result of inconsistent paper advancements. In other words, even though minor adjustments to the plotted data have been made in reproducing the pattern or design, the beginning and ending scans of the design are located on the paper 14 in substantially the same locations as would be if every paper advancement increment were equal, and of the desired length. It is also significant to realize that the minor adjustments made to the data not only result in desired starting and stopping endpoint, but also result in improved accuracy with which the design is reproduced, were it not for such adjustments.

Example Print Scans

Figure 14:
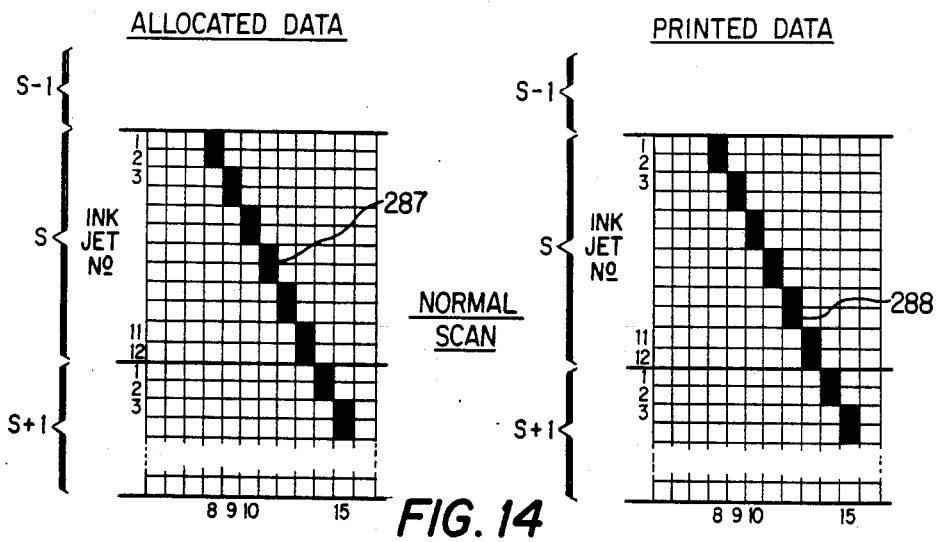
FIGS. 14-16 are graphical depictions of data allocated and printed in response to a desired paper travel increment, an excessive advancement and a paper advancement falling short in the desired length.
Figure 15:
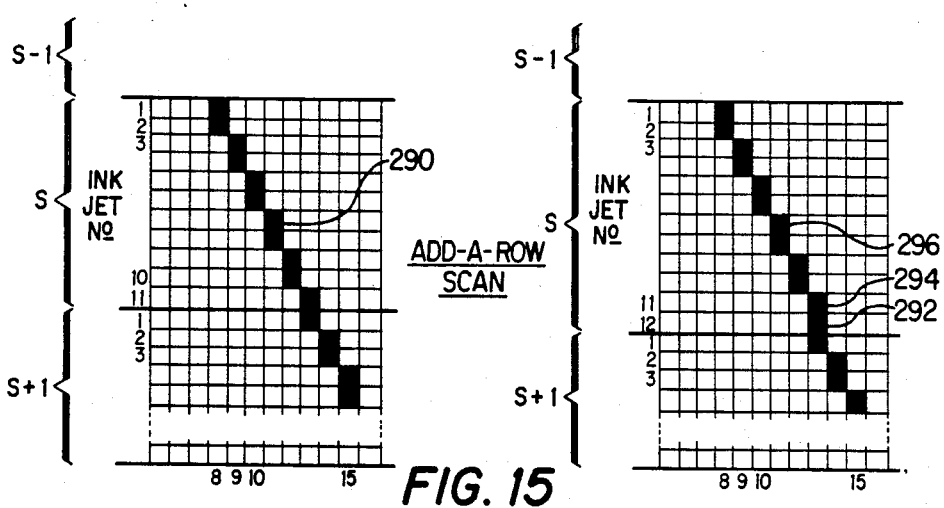
Figure 16:
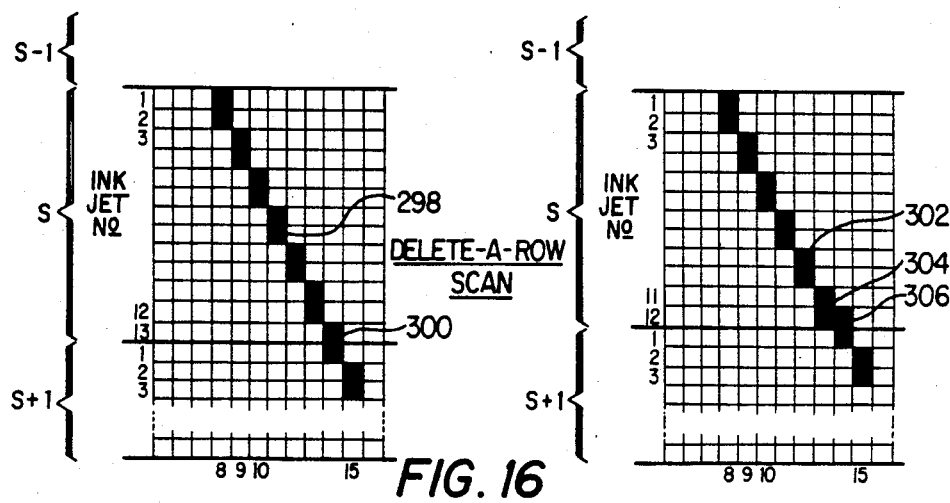

In FIGS. 14-16 there are shown successive scans, i.e. $S-1$, $S$ and $S+1$, both for the data allocated and that printed. In the illustrations, it is arbitrarily assumed that the desired lines to be plotted correspond to the firing of ink jets one and two in reticle column eight, ink jets three and four in reticle column nine, ink jets five and six in reticle column ten, etc. A diagonal-like line 287 is thus reproduced on the paper 14. In the plot of FIG. 14, the number of rows of data allocated is equal to the number plotted. Since it is assumed in FIG. 14 that the paper 14 has been indexed a proper amount from scan S to scan $S+1$, the orderly progression of ink jet firings are repeated in scan $S+1$, starting again with reticle column fourteen. As a result, if the paper 14 is subsequently indexed by correct amounts, the diagonal line 288 is generated from the left margin of the paper 14 to the right margin thereof.

With regard to FIG. 15, there is illustrated the situation in which the paper 14 has advanced less than the desired amount. The data is shown in scan S in the situation where the paper has advanced only far enough to accommodate the allocation of the first eleven data bits 290. However, according to the algorithm for adjusting plot data to correct for the short paper advancement, twelve lines are printed; the twelfth line 292 becoming a repeat of the data in line eleven 294. It is seen from the printed plot of FIG. 15, that row twelve 292 has been added as the duplicate of the plot data of row eleven 294. With the add-a-row scheme, the linearity of the line 296 is improved over that which would be plotted absent such algorithm. In the $S+1$ scan of FIG. 15, row twelve 292 of the previous S scan and row one of the $S+1$ scan are both plotted in reticle column thirteen. Subsequent plots in reticle columns fourteen and fifteen proceed in the normal manner.

FIG. 16 illustrates the situation where the paper has incremented too far, i.e. to the extent that the space can accommodate thirteen rows, rather than twelve rows of data. The allocated data 298 corresponding to the S scan illustrates an additional data bit 300 allocated in row thirteen. Had the incremental advancement of the paper 14 been correct, data bit 300 would have been plotted by ink jet number one in scan S+1. On the occurrence of an excessive paper advance, the computer 22 sends the next thirteen allocated data bits along with a "delete-a-row" instruction for processing by the processor 26. On receiving this instruction, the processor 26 executes a delete-a-row routine, whereupon twelve bits of data are sent to the plotter; bit twelve being the result of the logical OR operation of bits twelve and thirteen received from the computer 22. As a result, the printed plot of FIG. 16 shows the plotted data line 302 having bit twelve 304 printed. In addition, scan S prints data bit thirteen 300 as plot data 306 in reticle column fourteen. In scan S+1, the plotted data continues as normally allocated.

Computer Operation Flowcharts

The delete-a-row scheme illustrated in FIG. 16 provides an adjustment in the plotted data when the paper 14 has advanced an excessive amount. The distortion of the plotted data is thereby reduced, and the overall accuracy of the design or pattern is substantially restored.

Figure 17:
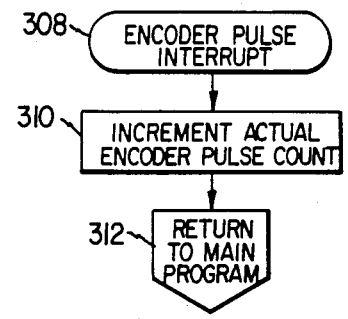
FIGS. 17-19 are flow charts showing the computer processor steps taken in coordinating the length of paper advancement with the data allocated to be printed.

The computer 22 and processor 26 operate in accordance with the flow charts of FIGS. 17–19 to provide the data allocation schemes described in connection with FIGS. 14–16. As noted above, the computer 22 receives paper travel encoder information, and thereby determines whether the extent of travel is normal, excessive or too little. In FIG. 17, flow chart block 308 illustrates that the computer 22 is provided with an interrupt from the paper travel encoder 36. The number of pulses output by the encoder 36 are counted by the computer 22, and the actual encoder pulse count is recorded, as shown by block 310. After the encoder 36 interrupt has been serviced by the computer 22, control is returned to the main program 312.

Figure 18:
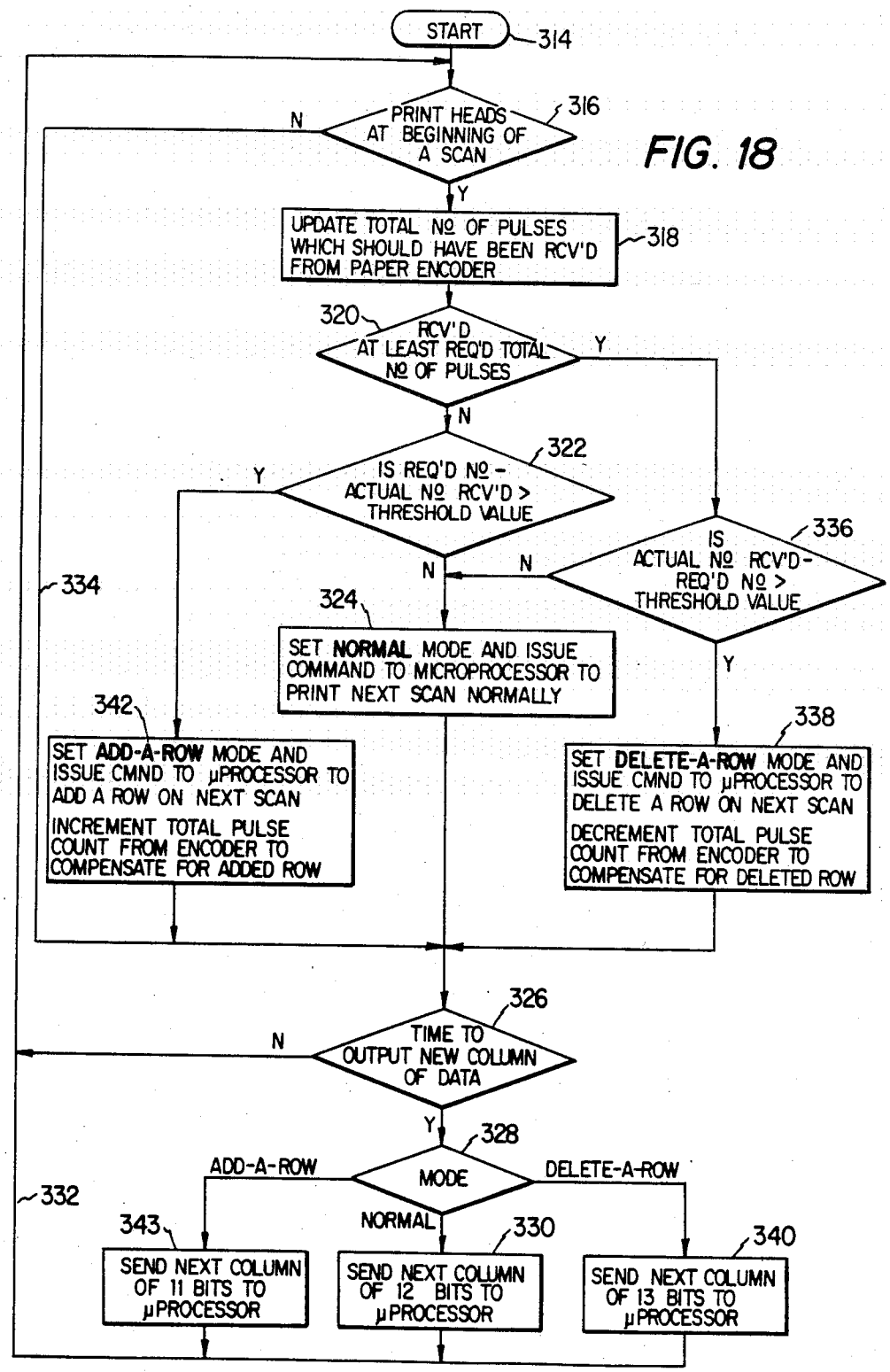

FIG. 18 depicts the main program of the computer 22 in processing the normal, add-a-row and delete-a-row schemes or algorithms. After entering the main program from the start block 314, the computer 22 ascertains whether the print heads 98–104 are at the beginning of a scan 316. As noted previously, a right-hand scan begins at the left of the reticle scale 116, and a left-hand scan begins at the right of the reticle scale 116. In the event the print heads 98–104 are at the beginning of a scan, the computer 22 updates the total number of pulses which should have been received from the paper encoder 318. As indicated in flow chart block 320, the computer 22 determines if at least the required total number of paper travel encoder pulses have been received. If the required number of pulses minus the actual number received is not greater than the threshold value, as noted by block 322, the computer 22 branches to block 324. When the computer 22 has reached flow chart block 324, the processor 26 is signaled that the next scan is to be printed according to the normal mode. As noted in flow chart block 326, if the computer 22 resolves that it is time to output a new column of data, the normal mode is selected 328, and the computer 22 sends the next column of twelve bits to the processor 26 (block 330). The computer 22 then returns by line 332 to block 316.

If the computer 22 determines in accordance with flow chart block 316 that the print heads 98–104 are not at the beginning of a scan, the computer 22 is branched by line 334 to block 326. If it is time to output a new column of data, blocks 328 and 330 are processed, whereupon the next column of twelve bits are sent to the processor 26 to be processed in accordance with the mode earlier established in block 324.

If, on the other hand, it is not time to output a new column of data in block 326, the computer 22 again branches to block 316. Assuming the print heads 98–104 are again at the beginning of a scan 316, the number of paper travel encoder pulses received are updated 318, and if at least the required total number of pulses have been received, the computer 22 branches to block 336. A determination is then made whether the actual number of pulses received from the paper travel encoder 36, minus the required number, is greater than the threshold. If this decision is resolved in the negative, the computer 22 branches to block 324 and continues in accordance with the normal mode. If the result of block 336 is in the affirmative, such an indication means that the paper 14 has moved too far. The delete-a-row mode is then set, and the processor 26 is signalled accordingly, and the encoder pulse count is decremented by an amount sufficient to compensate for the correction being made, 338. Next, computer 22 determines if it is time to output a new column of data 326, and if so, the delete-a-row branch is taken from block 328 and the next column of thirteen bits is sent to the processor 26, in accordance with block 340. The computer 22 then returns by line 332 to block 316.

Continuing now from block 316 through blocks 318–322, if the required number of paper travel encoder pulses is greater than the actual number received by an amount greater than the threshold value, a branch is taken to block 342. A branch to block 342 indicates that the length of paper advance is less than the preferred length of advancement. The computer 22 then sets the add-a-row mode 328, and issues such command to the processor 26 and the encoder pulse count is incremented by an amount sufficient to compensate for the correction being made. On outputting a new column of data to the processor 26, the next column of eleven bits is sent 343. The computer 22 then returns again to block 316 of the flow chart shown in FIG. 18. The foregoing algorithm is followed prior to each scan of the print heads, irrespective of whether the scan is to the left or to the right.

Processor Operation Flowcharts

Figure 19:
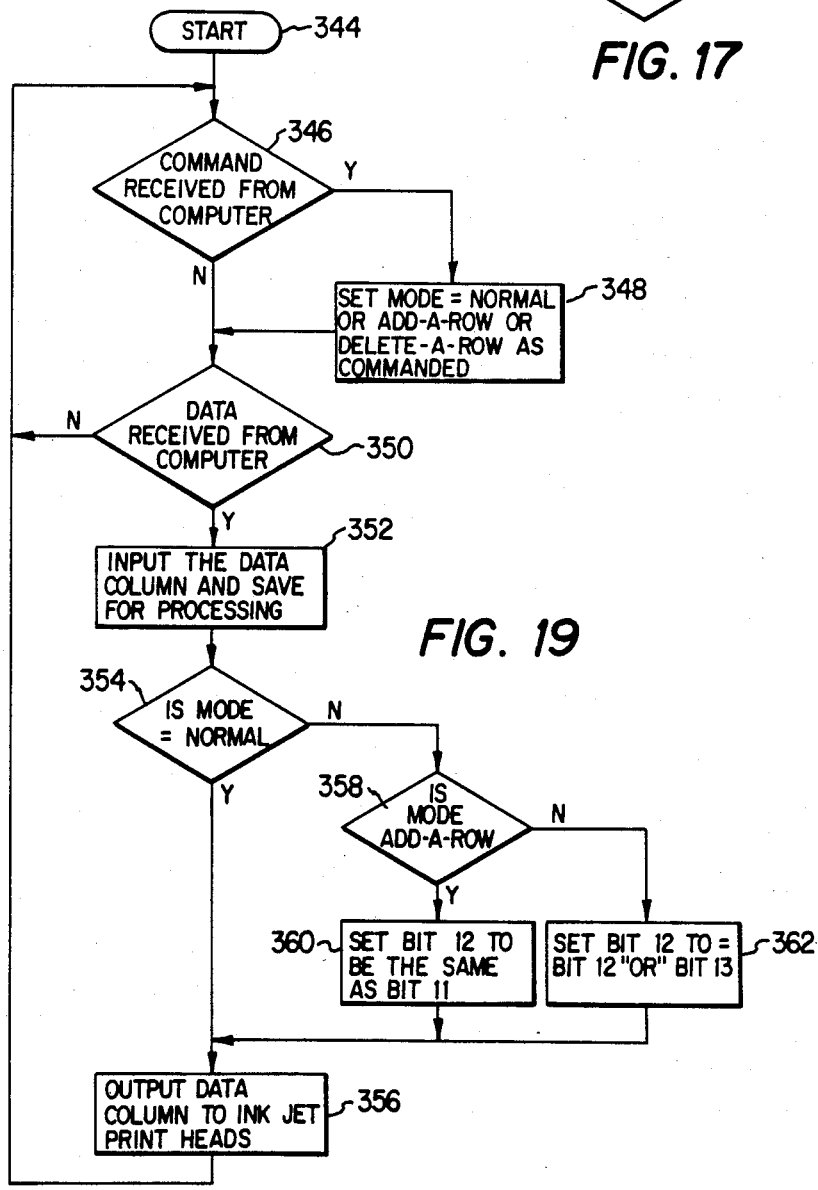

FIG. 19 is a flow chart of the programmed operations of the processor 26, illustrating the synchronization between the data plotted and the paper advancement for the various data allocation modes. From a start loop 344, the processor 26 enters a decision block 346 and determines if a command has been received from the computer 22. If a mode command has been received from the computer 22, the processor 26 branches to block 348, whereby the mode is set according to the command received. Whether or not a command has been received from the computer 22, the processor 26 enters block 350 of the flow chart, in which event it is determined whether data bits have been received from the computer 22. On a negative determination, the processor 26 is branched back to block 346.

In the event data has been received from the computer 22, as noted in functional block 350, the data is stored in a register as noted in 352. Next, the print mode received from the computer 22 is determined by first noting whether or not the mode is normal (block 354). A command received from the computer 22 indicating a normal mode causes the processor 26 to branch directly to block 356, whereby data twelve bits of data are output to the ink jet print heads 98–104. Control of the processor 26 is then returned back to functional block 346 where the presence of another command is detected.

If the mode is determined to be other than the normal mode, as determined by functional block 354, the processor 26 branches to block 358. In the event the mode received from the computer 22 is an add-a-row mode, bit twelve is set to be the same as bit eleven, as noted in block 360. Again, in the add-a-row mode, the adjusted data is output to the ink jet print heads 98–104, as shown in block 356.

In the event the paper has been advanced excessively, in which case the mode is neither normal nor add-a-row, as noted in blocks 354 and 358, the processor 26 is branched to block 362 where bits twelve and thirteen of the thirteen bits received from the computer 22 are logically ORed to form a new bit twelve. The eleven bits plus the new bit twelve are then output to the ink jet print heads, as noted in 356. The foregoing illustrates the manner in which the processing equipment coordinates the data base data with the plotter apparatus so as to provide a compact system capable of reproducing patterns or designs with a high degree of resolution and accuracy.

Electrical Interfaces Of The Plotter System

Figure 20:
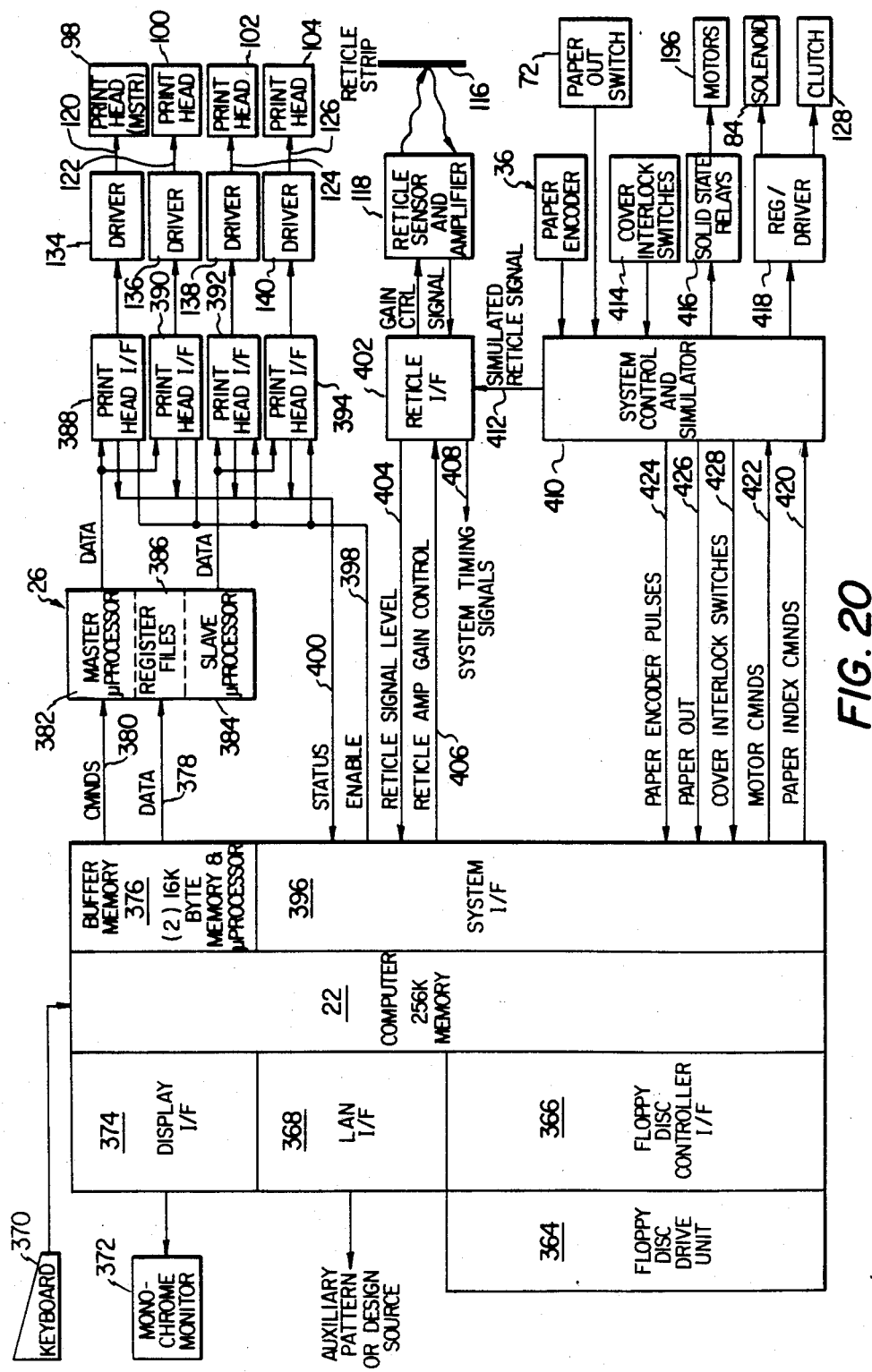
FIG. 20 is a block diagram of the electrical control circuits according to the invention.

A basic block diagram of the electrical apparatus of the invention is shown in FIG. 20. Primary control of the plotter, according to the invention, resides in the computer 22. Computer 22 may be of the personal computer type, conventionally available for example, from the International Business Machines Company. Computer 22 is supplied with 256 kilobits of solid state memory. A 360 kilobit floppy disk drive unit 364 is provided for storing data corresponding to patterns or designs. The disk drive 364 is provided with a disk controller 366 which interfaces the disk drive 364 to the computer 22. Various patterns or designs may be stored on the disks of the disk drive 364 for allowing the computer 22 to quickly reproduce the designs of patterns on the paper 14. A local area network (LAN) interface circuit 368 provides an interface to the computer 22 for inputting pattern or design data from a remote source. Communications with the computer 22 are provided by a keyboard 370 and a monochrome monitor 372. A display I/F circuit 374 interfaces the monitor 372 to the computer 22.

The computer 22 converts the vector data representative of patterns or designs into scan format, and stores the latter in a buffer memory 376. In accordance with the routines described above, the computer 22 transmits scan format data to the processor 26 on line 378. Eleven, twelve or thirteen bits of scan format data are output by the computer 22, one column at a time, on the data conductor 378. The normal, add-a-row and delete-a-row commands are transmitted by the computer 22 to the processor 26 on the command conductor 380. The processor 26 comprises a master microprocessor 382, a slave microprocessor 384 and register files 386. The details of the nature and exchange of information between the computer 22 and the processor 26 have been described in detail above. For the purposes of FIG. 20, it should be understood that the master microprocessor 382 outputs scan format data to print head interfaces 388 and 390. In a similar manner, the slave microprocessor 384 provides scan format data to print head interfaces 392 and 394. Two processors 382 and 384 are utilized to provide sufficient print data to the print heads in real time.

The print head interfaces 388–394 receive the scan format data and generate "fire" commands which are directed to respective driver circuits 134–140. The "fire" commands are amplified to the appropriate power level by the drivers 134–140 and transmitted to respective print heads 98–104. The selected ink jet nozzles are then fired in accordance with the appropriate data as determined by the mode command. If there is not a fire command for one or more of the print head nozzles, no ink droplet will be deposited on the paper 14.

Provided also with the computer 22 is a system interface circuit 396 for sensing and controlling various external circuits. For example, print head enable signals are generated by the computer 22 and directed to each of the print head interface circuits 388–394 on line 398. The status of each print head interface circuit 388–394 is, in turn, reported back to the computer 22 on line 400 by way of the system interface 396. The reticle sensor and amplifier 118 is coupled to the computer system interface 396 by a reticle interface circuit 402. The light reflected from the reticle strip 116 and received by the reticle sensor 118 is amplified by a variable gain amplifier (part of 118). The amplified reticle signal level is fed back to the computer 22 on line 404. The gain of the reticle amplifier is adjusted in accordance with the signal level on line 404, whereby a gain control signal is fed to the reticle sensor and amplifier 118 on line 406. In this manner, the system timing signals generated by the reticle sensor and amplifier 118 are optimized. The basis of the system timing signals on conductor 408 arise from the reticle sensor and amplifier 118, and thus the signals are controlled to provide a high degree of timing reliability.

For diagnostic purposes, a simulated reticle signal is generated by the system control and simulator 410 and is fed by conductor 412 to the reticle interface 402. The system control and simulator circuit 410 functions as an interface between the computer 22 and the paper travel encoder 36, the paper-out switch 72, the cover interlock switches 414, the various drive motors 196, the index solenoid 84 and the paper advance index clutch 128. The ac power which drives the motors 196 is switchably connected thereto by solid state relays, denoted by reference character 416. The paper index solenoid 84 and clutch 128 are driven by a regulator driver 418.

Paper index commands generated by the computer 22 are transmitted to the system control and simulator 410 on line 420. Similarly, the powering of the print head carriage motor 196 is controlled by the computer 22, and off-on commands are transmitted on line 422 to the system control and simulator 410. Pulses generated by the paper travel encoder 36 as a result of the solenoid indexing are fed through the system control and simulator 410 to the computer 22 on line 424. The status of the paper-out switch 72 and the cover interlock switches 414 is transmitted to the computer 22 on respective lines 426 and 428.

It can be seen from the foregoing that the disclosed upright plotter provides increased accuracy of the plotted design. Because of the scan technique, coupled together with the paper movement, very little exposed paper area is required to print over a large surface area. The provision of multiple print heads makes possible increased printing speed, without an attendant increase in the movement of the machine parts. A further improvement over known plotters is the feature of multiple ink jet heads which are capable of printing a variable width line. The width of the line can be varied as desired by separately controlling each ink jet nozzle. Furthermore, the actuation of the number of ink jets for a single actuation is varied in accordance with the amount by which the paper was previously incremented. The accuracy of the overall design is thereby not compromised by the inability to precisely control the paper increments.

In any plotting machine such as the foregoing, many changes can be made which are not relevant to the novel features taught by the invention. Bearing this in mind, specific embodiments disclosed herein are intended to be merely exemplary of the invention and not restrictive thereof since various modifications readily apparent to those familiar with the art can be made without departing from the spirit and scope of the invention as claimed below.

What is claimed is:

1. A plotter for printing information on sheet material to reproduce a pattern, comprising:
   a sheet carrier for moving the sheet material in a first direction;
   marking means for depositing information on the sheet material, said marking means being located adjacent the sheet material and movable in a second direction transverse to said first direction to thereby scan across the sheet material;
   means for causing said carrier to incrementally move the sheet material in said first direction;
   means for measuring the incremental movement of the sheet material;
   a processor connected to said carrier and to said marking means, and including data storage means for storing data corresponding to a pattern to be reproduced on the sheet material; and
   allocation means for utilizing from said data storage means a variable amount of data corresponding to the amount of paper movement.

2. The plotter of claim 1 further including means for incrementally moving the sheet material in said first direction alternately between each scan of said marking means.

3. The plotter of claim 2 further including means for moving said marking means in said second direction and providing scans in opposing directions.

4. The plotter of claim 3 wherein said means for moving moves said marking means in a reciprocating manner along a rectilinear path.

5. The plotter of claim 4 wherein said processor includes means for causing the incremental movement of the sheet material in said first direction, and then the reciprocating movement of said marking means in said second direction to thereby create a portion of said pattern.

6. The plotter of claim 5 further including means for causing said marking means to deposit ink on the sheet material in accordance with the stored data as said marking means is moving in said second direction.

7. The plotter of claim 6 further including a gauge on said marking means for detecting the position of said marking means in said rectilinear path, and means for transmitting position indicating information to said processor.

8. The plotter of claim 7 wherein said processor includes means for associating said position indicating information with said data and for causing said marking means to deposit ink on the sheet material in accordance with said data and said position indicating information.

9. The plotter of claim 1 wherein said sheet carrier includes means for incrementally moving the sheet material in said first direction and for each incremental movement thereof passing said marking means adjacent the sheet material in said second direction.

10. The plotter of claim 9 further including means for comparing the distance the sheet material is incrementally moved with a predetermined standard, and for varying the amount of data utilized from said data storage means only if the distance the sheet material is moved is different than said predetermined standard.

11. The plotter of claim 10 wherein said marking means includes means for simultaneously plotting plural impressions of information on the sheet material.

12. The plotter of claim 11 wherein said marking means includes means for printing a plurality of vertically aligned impressions during one scan, the composite number of impressions forming the width of the plotted line, and the data is arranged in said data storage means so that based upon the pattern to be reproduced, a selected number of data bits are assignable to be printed as said impressions, for each scan.

13. The plotter of claim 12 further including means for allocating a different number of data bits during a scan of said marking means when the sheet material is incremented an amount different than said predetermined standard.

14. The plotter of claim 13 wherein said allocating means allocates more data bits when the sheet material is incremented a distance greater than said predetermined standard.

15. The plotter of claim 14 wherein said allocating means allocates fewer data bits when the sheet material is incremented a distance less than said predetermined standard.

16. The plotter of claim 15 wherein for sheet increments greater than said predetermined standard, said allocating means generates new data information for plotting on the paper based on data stored in said data storage means.

17. A method of reproducing a pattern on paper, comprising the steps of:
   storing data bits in a data base corresponding to the pattern to be printed on the paper;
   arranging a plurality of rows of data bits from said data base for printing in a corresponding plurality of rows on the paper, the first row of data being associated with a first location at the top of the paper, and the last row of data being associated with a second location at the bottom of the paper, said first and second paper locations corresponding to the upper and lower parts of the pattern;
   advancing the paper in incremental lengths which vary about a predefined length; and
   printing each row of data on the paper in a manner corresponding to length of paper advancement such that the first row of data is printed at the first location and the last row of data is printed at the second location.

18. The method of claim 17 further including incrementally advancing the paper and measuring the length of advancement before printing a row of data on the paper.

19. The method of claim 18 further including printing a plurality of rows of data after each incremental advancement of the paper.

20. The method of claim 19 further including using N rows of data from the data base for printing when the paper is advanced said predefined length.

21. The method of claim 20 further including using a number of rows of data greater than N for printing when the paper advances an amount greater than the predefined length.

22. The method of claim 21 further including using a number of rows of data fewer than N for printing when the paper advances an amount less than the predefined length.

23. The method of claim 22 further including printing N lines of impressions across the paper irrespective of the length of paper advancement, using at least N−1 rows of data for each print scan across the paper.

24. The method of claim 23 further including adding a phantom row of data to be printed when the length of paper advancement is less than the predefined length, which phantom row of data is a duplicate of a row of data in the data base.

25. The method of claim 24 further including using N+1 rows of data from the data base and printing N lines of impressions across the paper when the length of paper advancement is greater than the predefined length.

26. A method of reproducing a pattern or design on paper from data stored in a data base; comprising the steps of:
   scanning a printer across the surface of the paper in a rectilinear path corresponding to a plurality of rows on the paper;
   advancing the paper in increments alternately between scans in a direction transverse to the rectilinear path;
   measuring the advancement of the paper;
   timing the printing of data by the printer in each scan so as to segment the scanned paper rows into areas corresponding to paper columns;
   arranging data bits from the data base in a plurality of rows corresponding to the paper rows and in a plurality of columns corresponding to the paper columns; and
   correlating the actual length of the measured paper advancement with the number of rows of data bits to be printed so that the number of rows used from the data base is different than the number of paper rows printed when the measured paper advancement differs from a predefined length.

27. The method of claim 26 further including alternately printing in one scan plural rows of data in one direction, and printing in another scan plural rows of data in an opposite direction.

28. The method of claim 27 further including scanning N print heads across a portion of the paper, each said portion having a length of about 1/N times the width of the paper.

29. The method of claim 26 wherein the correlating step is carried out in a manner such that when the paper advancement is less than the predefined length, the number of rows printed on the paper is greater than the number of rows of data used from the data base.

30. The method of claim 26 wherein the correlating step is carried out in a manner such that when the length of paper advancement is greater than the predefined length, the number of rows printed on the paper is less than the number of rows of data used from the data base.

31. The method of claim 26 wherein said correlation step is carried out in a manner such that when the amount of measured incremental paper advancement is equal to the predefined length, the number of rows printed on the paper is equal to the number of rows of data used from the data base.

32. The method of claim 30 wherein for paper advancements in excess of the predefined length, N+1 rows of data are allocated from the data base to be printed, and N paper rows are printed, the Nth paper row printed being the logical OR of the N and N+1 rows of data allocated from the data base.

33. The method of claim 29 wherein for paper advancements less than the predefined length, N−1 rows of data are allocated from the data base for printing, and N paper rows are printed, the Nth paper row printed being identical to the N−1 row of data allocated from the data base.

34. A plotter for reproducing a pattern on paper, comprising:
   a data processor including;
   a data base for storing a plurality of bits of data representative of the pattern to be plotted on the paper;
   means for arranging the stored data wherein the data can be accessed in a serial manner;
   a printer mounted for scanning movement laterally adjacent the paper, each said movement defining a scan, said printer being adapted for printing N impressions defining a column, each said impression being associated with one said data bit;
   paper advancement means for incrementally advancing paper from a continuous roll in approximate equal predetermined standard increments in a direction transverse to the scanning movements of said printer;
   measurement means for measuring the actual incremental advancement of the paper;
   comparator means for comparing the measured actual incremental advancement of the paper with said predetermined standard increments and for generating an output indicating a paper advancement greater or less than said standard increments; and
   means responsive to said output of said comparator means for allocating a selected number of bits from said data base for printing in a selected scan in dependence upon said comparator means output.

35. The plotter of claim 34 wherein said comparator means includes means for allocating N number of bits to be printed when the advancement of the paper is substantially equal to the predefined standard increments, for allocating N+1 bits for printing when the paper is advanced an amount greater than the predefined standard increments, and for allocating N−1 bits for printing when the paper is advanced an amount less than the predefined standard increments.

36. The plotter of claim 35 wherein said means for allocating prints N bits associated with N+1 data bits by forming the Nth bit to be printed by logically ORing the Nth data bit with the N+1 bit.

37. The plotter of claim 35 wherein said means for allocating prints N bits associated with N−1 data bits by forming the Nth bit to be printed by making the Nth data bit equal to the N−1 data bit.

38. The plotter of claim 35 wherein said allocation means arranges said data into data base rows, and allocates said data base rows by using N+1 data base rows of data bits and forming the Nth row of data to be printed by logically ORing the bits of the Nth data base row with the respective bits of the N+1 data base row.

39. The plotter of claim 35 wherein said allocation means arranges said data into data base rows, and allocates said data base rows by using N−1 said data base row rows of data bits and forming the Nth row of data to be printed by making the Nth row of data bits equal to the N−1 row of data bits.

40. The plotter of claim 34 wherein said means for allocating allocates said data bits for a print scan Y based on the amount by which the paper is advanced after the printing of a Y−1 scan.

41. The plotter of claim 34 wherein said printer includes a plurality of print heads, each mounted for simultaneous scanning movement.

42. The plotter of claim 41 wherein each said print head is mounted for scanning across only a portion of the width of the paper.

43. The plotter of claim 41 wherein each print said head is adapted for printing N impressions simultaneously.

44. The plotter of claim 41 further including means for directing a portion of the data bits of each row of data to a respective print head of said plurality.

45. The plotter of claim 34 further including locator means for providing an indication of the location of said printer during scanning movement with respect to the paper.

46. The plotter of claim 45 wherein said locator means provides a timer for causing the printer to print said impressions of the data bits during said scanning movements.

47. A plotter for reproducing a pattern on paper comprising:
a paper carriage for moving paper from a continuous roll;
a plurality of print heads mounted for simultaneous movement adjacent said paper, each said print head being adapted for simultaneously printing a plurality of impressions on the paper and each said print head being movable along a different portion of a line transverse to the movement of the paper;
a data base for storing data corresponding to the pattern; and
a controller for coordinating the movement of the paper with the movement of each said print head, and for transferring said data to each said print head to cause the simultaneous printing of data by each said print head and thereby reproduce the stored pattern, said controller further including means for transferring a variable amount of data from said data base to be printed based upon the amount of movement of the paper.

48. The plotter of claim 47 further including four print heads.

49. The plotter of claim 48 wherein each said print head is mounted for movement along a different portion of a single rectilinear path.

50. The plotter of claim 48 further including means for ganging said print heads together for simultaneous movement.

51. The plotter of claim 47 further including means for moving said paper in increments.

52. The plotter of claim 51 wherein said controller includes means for causing more data to be printed after an increment when said paper is incremented an amount greater than a predefined amount.

53. The plotter of claim 52 wherein said controller causes less data to be printed after an increment in which said paper is incremented an amount less than said predefined amount.

54. The plotter of claim 47 wherein said controller comprises a plurality of data processors for supplying the data to said plurality of print heads while said print heads are moving adjacent said paper.

55. The plotter of claim 54 further including means for moving said print heads at about forty-seven inches per second.

* * * * *